United States Patent
Bellman et al.

(10) Patent No.: US 11,523,587 B1
(45) Date of Patent: Dec. 13, 2022

(54) ANIMAL HABITAT AND ASSOCIATED METHOD

(71) Applicant: GLUP, Denver, CO (US)

(72) Inventors: Christina S. Bellman, Miami, FL (US); Thomas A. Trudel, Icod de los Vinos (ES); Ryan C. Artale, Crested Butte, CO (US)

(73) Assignee: GLUP, Denver, CO (US)

( * ) Notice: Subject to any disclaimer, the term of this patent is extended or adjusted under 35 U.S.C. 154(b) by 0 days.

(21) Appl. No.: 17/685,366

(22) Filed: Mar. 2, 2022

(51) Int. Cl.
*A01K 1/03* (2006.01)

(52) U.S. Cl.
CPC .................................... *A01K 1/03* (2013.01)

(58) Field of Classification Search
CPC .......... A01K 1/03; A01K 1/034; A01K 1/035; A01K 15/00; A01K 15/02; A01K 15/024; A01K 15/027; A01K 1/031; A01K 1/033
USPC .......................................... 119/482, 702–706
See application file for complete search history.

(56) References Cited

U.S. PATENT DOCUMENTS

| | | | |
|---|---|---|---|
| 2,684,051 A * | 7/1954 | Leblond ................. | A01K 1/031 210/299 |
| 4,129,975 A * | 12/1978 | Gabriel ................ | A63H 33/101 D8/382 |
| 4,790,265 A | 12/1988 | Manson | |
| 5,080,042 A | 1/1992 | Rubin | |
| 5,265,557 A | 11/1993 | Lovitz | |
| 5,352,149 A * | 10/1994 | Melashenko ............ | A47G 5/00 446/490 |
| 5,577,465 A | 11/1996 | Cook | |
| 5,803,019 A | 9/1998 | Heilborn et al. | |
| 5,992,348 A | 11/1999 | Harding | |
| 6,004,182 A * | 12/1999 | Pasin ...................... | E04H 15/44 446/490 |
| 7,044,083 B2 | 5/2006 | Farmer et al. | |
| 7,228,820 B1 * | 6/2007 | Kellogg ................. | A01K 1/034 119/498 |
| 7,621,235 B2 | 11/2009 | Genitrini | |
| 7,681,524 B1 | 3/2010 | Hudson | |
| 8,020,518 B1 * | 9/2011 | Reinke ................. | A01K 15/025 119/482 |
| 8,522,724 B2 * | 9/2013 | Murrer ................. | A01K 15/027 119/706 |

(Continued)

FOREIGN PATENT DOCUMENTS

| | | |
|---|---|---|
| CN | 106973803 A | 7/2017 |
| CN | 108401934 A | 8/2018 |

(Continued)

OTHER PUBLICATIONS

Kitty Kubes, "Kitty Kubes Cat Furniture Building Sets", Retrieved from internet on Feb. 11, 2022 at URL—https://learnmore.kittykubes.com/subscribe?fbclid=IwAR3uajizrwZnppBzVhmXUiUGAuLFR9gD3EVITp5XVg7oSeQGO8SSahO1yOk, 7 pages.

*Primary Examiner* — Peter M Poon
*Assistant Examiner* — Danielle A Clerkley
(74) *Attorney, Agent, or Firm* — Patent Engineering, LLC; Stephen B. Katsaros

(57) ABSTRACT

In one configuration, an animal habitat assembly is disclosed having a plurality of connectors that include a body and a plurality of coupling-holes formed therein and a plurality of rods configured to couple the rod with the connector. Accordingly, the plurality of connectors and rods are coupled to create a structure.

28 Claims, 23 Drawing Sheets

(56) References Cited

U.S. PATENT DOCUMENTS

| | | | |
|---|---|---|---|
| 9,320,980 B2 | 4/2016 | Schweikardt et al. | |
| 9,635,833 B2 | 5/2017 | Oeltjen et al. | |
| 9,803,669 B2 | 10/2017 | Compton | |
| 10,085,417 B2 | 10/2018 | Miller | |
| 10,107,320 B2 | 10/2018 | Compton | |
| 10,952,407 B2 | 3/2021 | Hahn | |
| 2004/0149236 A1 | 8/2004 | Slone | |
| 2005/0051106 A1 | 3/2005 | Tulgren et al. | |
| 2009/0199782 A1* | 8/2009 | Drumm | A01K 15/024 119/482 |
| 2010/0077961 A1* | 4/2010 | Lipscomb | A01K 15/02 119/702 |
| 2010/0154719 A1* | 6/2010 | Kellogg | A01K 15/025 119/702 |
| 2014/0197168 A1 | 7/2014 | Miller et al. | |
| 2016/0057969 A1* | 3/2016 | Kellogg | A01K 1/034 119/474 |
| 2016/0128301 A1* | 5/2016 | Venezia | A01K 63/003 119/248 |
| 2020/0121097 A1 | 4/2020 | Lutz et al. | |

FOREIGN PATENT DOCUMENTS

| | | |
|---|---|---|
| KR | 102139890 B1 | 7/2020 |
| WO | 1995002739 A1 | 1/1995 |

* cited by examiner

ANIMAL HABITAT AND ASSOCIATED METHOD

TECHNICAL FIELD

This disclosure relates to animal habitats, particularly to an animal habitat assembly of different components assembled to form customized structures.

BACKGROUND

Animal habitats for animal recreational typically include several structures that allow the animal (e.g., a cat) to move or rest within.

SUMMARY

An animal habitat assembly is disclosed according to one illustrative configuration of the present disclosure. The animal habitat assembly includes a plurality of rods and connectors that can be coupled to each other to create a customized and unique structure, for example, a cuboid structure. Each connector includes a plurality of holes, such that a rod can be inserted and coupled with the connector through a hole. Further, multiple rods, e.g., three or four rods, can be coupled with a single connector at one time to create a structure.

Therefore, this allows for any number of rods and connectors to be coupled to create customized structures of different shapes and sizes. The connectors and rods may be fastened together using fasteners like screws to strengthen the structure. The structures thus can be easily assembled by a user without requiring any expert intervention. Combining the connectors and rods also makes it possible to create customized structures while using fewer types of parts and molds. The above combination allows a user to use their creativity in several ways to create different configurations of structures. Moreover, the connectors and rods are easily manufacturable. Further, the connector's symmetrical shape (e.g., the spherical shape) allows usage in various orientations.

The animal habitat assembly further includes panels attached to the rods forming the structure. Further, the panels can be attached using fasteners. These fasteners allow the panels to be removed and replaced, for example, to change the structure's configuration (aesthetics and shape) or when the panels have become dirty over time. Further, two different types of panels are provided, i.e., a first type panel and a second type panel having different configurations, for properly attaching the panels on the rods, especially in the scenarios when two panels are to be attached to the same rod. Therefore, the first type panel and the second type panel form nestable counterparts. The panels may be made from fabric. The fabric material of the panels makes for a comfortable experience with the structure and reduces the chances of injury to the animal. Constructing the panels out of fabric also makes it possible to create customized structures that can be washed in a washing machine, sometimes referred to herein as a wash configuration.

The animal habitat assembly further includes a collapsible base that can collapse into a compact assembly for storage and transportation. Parts (such as connectors, panels and rods) may be configured to nest together (e.g. without wasted space) for storage and transportation. The base can be easily assembled into a rigid form to support the structure created by assembling the rods, the connectors, and the panels. The base allows for easy assembly with the structure by simply positioning the structure over the base.

Further, one or more ramps may be included in the animal habitat assembly. These ramps can be mounted on the rods of the structure to create a pathway for the animal to climb up or down the structure. The ramp is provided with claws at its top and bottom edges to allow for an easy and effective mounting with the rest of the structure. The shape of the ramp is such that it can be used interchangeably between its top edge and bottom edge for greater flexibility.

In one illustrative configuration, an animal habitat assembly is disclosed. The animal habitat assembly may include a plurality of connectors, each of the plurality of connectors including a body and at least three coupling-holes formed in the body. The at least three coupling-holes may be oriented transverse to each other. The animal habitat assembly may further include a plurality of rods, each of the plurality of rods including a first end and a second end. The first end of a rod of the plurality of rods is configured to fit into one of the at least three coupling-holes of a first associated connector of the plurality of connectors to couple the rod with the first associated connector. The second end of the rod is configured to fit into one of the at least three coupling-holes of a second associated connector of the plurality of connectors to couple the rod with the second associated connector. The animal habitat assembly may further include at least one panel with four panel-edges. Each of the four panel-edges of at least one panel is configured to attach to an associated rod of the plurality of rods. The animal habitat assembly is configurable between a first configuration and a second configuration. In the first configuration, each of the plurality of rods is decoupled from each of the first associated connector and the second associated connector, and each of the four panel-edges of at least one panel is detached from an associated rod. In the second configuration, a set of twelve rods of the plurality of rods may be coupled with a set of eight connectors of the plurality of connectors to form a cuboid structure defining four side planes, a bottom plane, and a top plane, each of the four side planes may be defined by four rods of the set of twelve rods, each of the four panel-edges of the at least one panel may be attached to an associated rod of the four rods of the set of twelve rods defining a side plane of the four side planes, and each connector of the set of eight connectors may be coupled with at least three rods of the set of eight rods, via the three coupling-holes. Further, each of the plurality of rods and the plurality of connectors is configured to receive a fastener to fasten a rod of the plurality of rods with a connector of the plurality of connectors. Furthermore, each of the plurality of rods includes one of a circular and a polygonal cross-section. Accordingly, each of the at least three coupling-holes of each of the plurality of connectors includes one of a circular and a polygonal cross-section similar to the cross-section of each of the plurality of rods.

Further, in one illustrative configuration, in the second configuration, a set of twenty rods of the plurality of rods may be coupled with a set of twelve connectors of the plurality of connectors to form a double-cuboid structure. The double-cuboid structure may include a first cuboid structure defining four side planes. Each of the four side planes is defined by four rods of the set of twenty rods. A second cuboid structure is positioned above the first cuboid structure and may include four side planes. Each of the four side planes is defined by four rods of the set of twenty rods. Each of the four connectors of the set of twelve connectors is coupled with four rods of the set of twenty rods via the four coupling-holes. Each of the remaining eight connectors of the set of twelve connectors is coupled with three rods of the set of twenty rods via the three coupling-holes. Each of the four panel-edges of at least one panel is attached to an associated rod of the four rods of the set of twenty rods defining a side plane of the four side planes of the first cuboid structure or the second cuboid structure.

In one illustrative configuration, at least one panel is configured to attach to an associated rod of the plurality of rods via at least one fastener. To this end, each panel-edge of the least one panel may include at least one loop configured to loop around a rod. The loop(s) includes at least one fastener configured to fasten with at least one panel. The animal habitat assembly may further include a bottom plate having four plate-edges. The bottom plate may be configured to be attached to four rods defining the bottom plane of the cuboid structure. The bottom plate may include at least one bracket provided at each of the four plate-edges. Each of the at least one bracket may be configured to engage with a rod of the four rods defining the bottom plane to attach the bottom plate to the four rods. The animal habitat assembly may further include a top plate having four plate-edges. The top plate may be configured to be attached to four rods defining the top plane of the cuboid structure. The top plate includes at least one bracket provided at each of the four plate-edges. Each of the at least one bracket is configured to engage with a rod of the four rods defining the top plane to attach the top plate to the four rods defining the top plane.

In one illustrative configuration, the animal habitat assembly further includes a base configured to support the cuboid structure. The bottom plate may be configured to be positioned over the base. The base includes a first half longitudinal section and a second half longitudinal section. The first half longitudinal section and the second half longitudinal section are configured to engage with each other to define: a hollow cylindrical portion, a bottom frustrum portion defined at a bottom end of the cylindrical portion, and a top frustrum portion defined at a top end of the cylindrical portion. The base may be configurable between a first configuration and a second configuration. In the first configuration, the first half longitudinal section and the second half longitudinal section are disengaged from each other, and the first half longitudinal section is configured to collapse into the second half longitudinal section. In the second configuration, the first half longitudinal section and the second half longitudinal section are engaged with each other to define the hollow cylindrical portion, the bottom frustrum portion, and the top frustrum portion.

In one illustrative configuration, the animal habitat assembly further includes at least one ramp. At least one ramp includes a top edge, a bottom edge, and a slant surface defined between the top edge and the bottom edge. At least one ramp may be configured to mount on: one of the four rods defining the bottom plane of the cuboid structure via the top edge, or one of the four rods defining the top plane of the cuboid structure via the top edge. Further, at least one ramp comprises a pair of claws provided on the top edge. The ramp(s) is configured to mount on one of the four rods defining the bottom plane or on one of the four rods defining the top plane of the cuboid structure via the pair of claws.

An animal habitat assembly is disclosed (in accordance with another illustrative configuration of the present disclosure) that may include a plurality of connectors, each of the plurality of connectors including a body and a first pair of coupling-holes formed in the body and defined opposite to each other, a second pair of coupling-holes formed in the body and defined opposite to each other, and a third pair of coupling-holes formed in the body and defined opposite to each other. The first pair, the second pair, and the third pair of the coupling-holes are oriented along x-axis, y-axis, and z-axis, respectively. The animal habitat assembly may further include a plurality of rods, each of the plurality of rods including a first end and a second end. The first end of a rod of the plurality of rods is configured to fit into one coupling-hole of the first pair, the second pair, and the third pair of the coupling-holes of a first associated connector of the plurality of connectors, to couple the rod with the first associated connector. The second end of the rod is configured to fit into one coupling-hole of the first pair, the second pair, and the third pair of the coupling-holes of a second associated connector of the plurality of connectors to couple the rod with the second associated connector. The animal habitat assembly may further include at least one panel comprising four panel-edges. Each of the four panel-edges of at least one panel is configured to attach to an associated rod of the plurality of rods. The animal habitat assembly is configurable between a first configuration and a second configuration. In the first configuration, each of the plurality of rods is decoupled from each of the first associated connector and the second associated connector, and each of the four panel-edges of at least one panel is detached from an associated rod. In the second configuration, a set of rods of the plurality of rods are coupled with a set of connectors of the plurality of connectors to form at least one cuboid structure defining at least four side planes, at least one bottom plane, and at least one top plane.

In one illustrative configuration, at least one panel is one of a first type panel comprising four panel-edges and a second type panel comprising four panel-edges. The first type panel includes two loops at each of the four panel-edges. The second type panel includes two loops at each of two of the four panel-edges facing opposite to each other and one loop at each of the remaining two of the four panel-edges facing opposite to each other.

A method of assembling an animal habitat is disclosed, in accordance with one illustrative configuration, that may include providing a plurality of connectors. Each of the plurality of connectors includes a body and at least three coupling-holes formed in the body. The at least three coupling-holes are oriented transverse to each other. The method further includes providing a plurality of rods, each of the plurality of rods including a first end and a second end. The first end of a rod of the plurality of rods may be configured to fit into one of the at least three coupling-holes of a first associated connector of the plurality of connectors to couple the rod with the first associated connector. The second end of the rod may be configured to fit into one of the at least three coupling-holes of a second associated connector of the plurality of connectors to couple the rod with the second associated connector. The method further includes coupling the plurality of connectors with the plurality of rods to form at least one cuboid structure defining: at least four side planes, each defined by four rods, at least one bottom plane, each defined by four rods, and at least one top plane, each defined by four rods. The method further includes attaching a panel along one of the at least four side planes, at least one bottom plane, and at least one top plane. The panel includes four panel-edges and at least one loop provided at each of the four panel-edges. Attaching the panel includes looping the at least one loop about a rod of the four rods defining one of the at least four side planes, the at least one bottom plane, and the at least one top plane, and upon looping, fastening the loop with the panel using at least one fastener.

The method further includes coupling the plurality of connectors with the plurality of rods, fastening each of the plurality of rods with an associated connector of the plurality of connectors using a fastener. Further, the method includes providing a bottom plate comprising four plate-edges and attaching the bottom plate to the four rods defining the bottom plane(s) of at least one cuboid structure. The bottom plate may include at least one bracket provided at each of the four plate-edges. Attaching the bottom plate, as such, includes engaging each of at least one bracket with a rod of the four rods defining the bottom plane to attach the bottom plate to the four rods defining the bottom plane. The method further includes providing a top plate comprising four plate-edges and attaching the top plate to the four rods defining the at least one top plane of the at least one cuboid structure. The top plate includes at least one bracket provided at each of the four plate-edges. Therefore, attaching the top plate may include engaging each of at least one bracket with a rod of the four rods defining the top plane to attach the top plate to the four rods defining the top plane.

The method further includes providing at least one base configured to support at least one cuboid structure. The base includes a first half longitudinal section and a second half longitudinal section. The first half longitudinal section and the second half longitudinal section are configured to engage with each other to define: a hollow cylindrical portion, a bottom frustrum portion defined at a bottom end of the cylindrical portion, and a top frustrum portion defined at a top end of the cylindrical portion. The base is configurable between a first configuration and a second configuration. The method may further include providing at least one base in the first configuration, wherein in the first configuration, the first half longitudinal section and the second half longitudinal section are disengaged from each other, and the first half longitudinal section is configured to collapse into the second half longitudinal section. Further, the method includes configuring the base into the second configuration by engaging the first half longitudinal section and the second half longitudinal section with each other to define the hollow cylindrical portion, the bottom frustrum portion, and the top frustrum portion. Upon configuring the base into the second configuration, the method may further include positioning at least one cuboid structure over the base.

The method further includes providing at least one ramp, the at least one ramp including a top edge, at least one claw provided on the top edge, a bottom edge, at least one claw provided on the bottom edge, and a slant surface defined between the top edge and the bottom edge. The method includes mounting the at least one ramp on one of the four rods defining the bottom plane or on one of the four rods defining the top plane of the cuboid structure via the claw(s) provided on the top edge and the at least one claw provided on the bottom edge.

An animal habitat assembly is disclosed, in accordance with yet another illustrative configuration of the present disclosure, which may include a plurality of connectors, each of the plurality of connectors including a body and at least three coupling-holes formed in the body. The at least three coupling-holes are oriented transverse to each other. The animal habitat assembly further includes a plurality of rods, each of the plurality of rods including a first end and a second end. The first end of a rod of the plurality of rods is configured to fit into one of the at least three coupling-holes of a first associated connector of the plurality of connectors to couple the rod with the first associated connector. The second end of the rod is configured to fit into one of the at least three coupling-holes of a second associated connector of the plurality of connectors to couple the rod with the second associated connector. The animal habitat assembly further includes at least one panel having four panel-edges. Each of the four panel-edges of at least one panel is configured to attach to an associated rod of the plurality of rods. The animal habitat assembly is configurable between a first configuration and a second configuration. In the first configuration, each of the plurality of rods is decoupled from each of the first associated connector and the second associated connector, and each of the four panel-edges of at least one panel is detached from an associated rod. In the second configuration, the plurality of rods are coupled with the plurality of connectors to form a prismatic structure defining at least three side planes, a bottom plane, and a top plane, each of the at least three side planes may be defined by four rods of the plurality of rods, and each of the four panel-edges of the at least one panel is attached to an associated rod of the four rods defining a side plane of the at least three side planes.

An animal habitat assembly is disclosed, in accordance with yet another illustrative configuration of the present disclosure, which may include a plurality of connectors, each of the plurality of connectors may include: a body; and at least three coupling-holes formed in the body, each of the three coupling-holes oriented transverse to each other; a plurality of rods, each of the plurality of rods may include: a first end; and a second end; wherein the first end of a rod of the plurality of rods is configured to fit into one of the at least three coupling-holes of a first associated connector of the plurality of connectors, to couple the rod with the first associated connector; wherein the second end of the rod is configured to fit into one of the at least three coupling-holes of a second associated connector of the plurality of connectors, to couple the rod with the second associated connector; at least one panel may include four panel-edges; wherein each of the four panel-edges of the at least one panel is configured to attach to an associated rod of the plurality of rods; wherein the animal habitat assembly is configurable between an assembled configuration and a wash configuration; wherein in the assembled configuration, a set of twelve rods of the plurality of rods are coupled with a set of eight connectors of the plurality of connectors to form a cuboid structure defining four side planes, a bottom plane, and a top plane; each of the four side planes is defined by four rods of the set of twelve rods; each of the four panel-edges of the at least one panel is attached to an associated rod of the four rods of the set of twelve rods defining a side plane of the four side planes; and each connector of the set of eight connectors is coupled with at least three rods of the set of twelve rods, via the three coupling-holes wherein in the wash configuration, the set of twelve rods of the plurality of rods are coupled with the set of eight connectors of the plurality of connectors to form the cuboid structure defining the four side planes, the bottom plane, and the top plane; each of the four side planes is defined by four rods of the set of twelve rods; each of the four panel-edges of the at least one panel is detached from the associated rod of the four rods of the set of twelve rods defining a side plane of the four side planes; and each connector of the set of eight connectors is coupled with at least three rods of the set of twelve rods, via the three coupling-holes.

An animal habitat assembly is disclosed, in accordance with yet another illustrative configuration of the present disclosure, which may include a cuboid structure defining four side planes, a bottom plane, and a top plane; at least one panel may include four panel-edges; at least one attachment point; and an accessory removably attached to the panel via the attachment point.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, together with the detailed description, explain the principles of the animal habitat. No attempt is made to show structural details in more detail than is necessary for a fundamental understanding of the animal habitat and various ways in which it is practiced. The following figures of the drawing include.

In the appended figures, similar components and/or features may have the same numerical reference label. Further, various components of the same type may be distinguished by following the reference label with a letter. If only the first numerical reference label is used in the specification, the description is applicable to any one of the similar components and/or features having the same first numerical reference label irrespective of the suffix.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. It is intended that the following detailed description be considered as illustrative only, with the true scope and spirit being indicated by the following claims.

It is desirable to provide an animal habitat assembly that can be reconfigured into different customized shapes and sizes, is collapsible for easy storage and transportation, is easily assembled without requiring an expert intervention or usage of specialized tools, and is easily cleaned by household means (e.g. handwashing or machine washing) during a wash configuration. In particular, it is desirable to provide an animal habitat assembly that allows any number of rods and connectors to be coupled together to create structures of different shapes and sizes and further allows the connectors and rods to be fastened together using fasteners (e.g., screws). Further, it is desirable to provide panels that can be attached to the rods forming the structure, for example, using fasteners that allow the panels to be removed and replaced. It is further desirable to provide for a collapsible base that can collapse into a compact assembly for ease of storage and transportation and can be easily assembled into a rigid form to support the structure created by the assembly of the rods, the connectors, and the panels. Further, it is desirable to provide for one or more ramps that can be mounted easily and effectively on the rods of the structure to create a pathway for the animal to climb up or down the structure.

Figure 1:
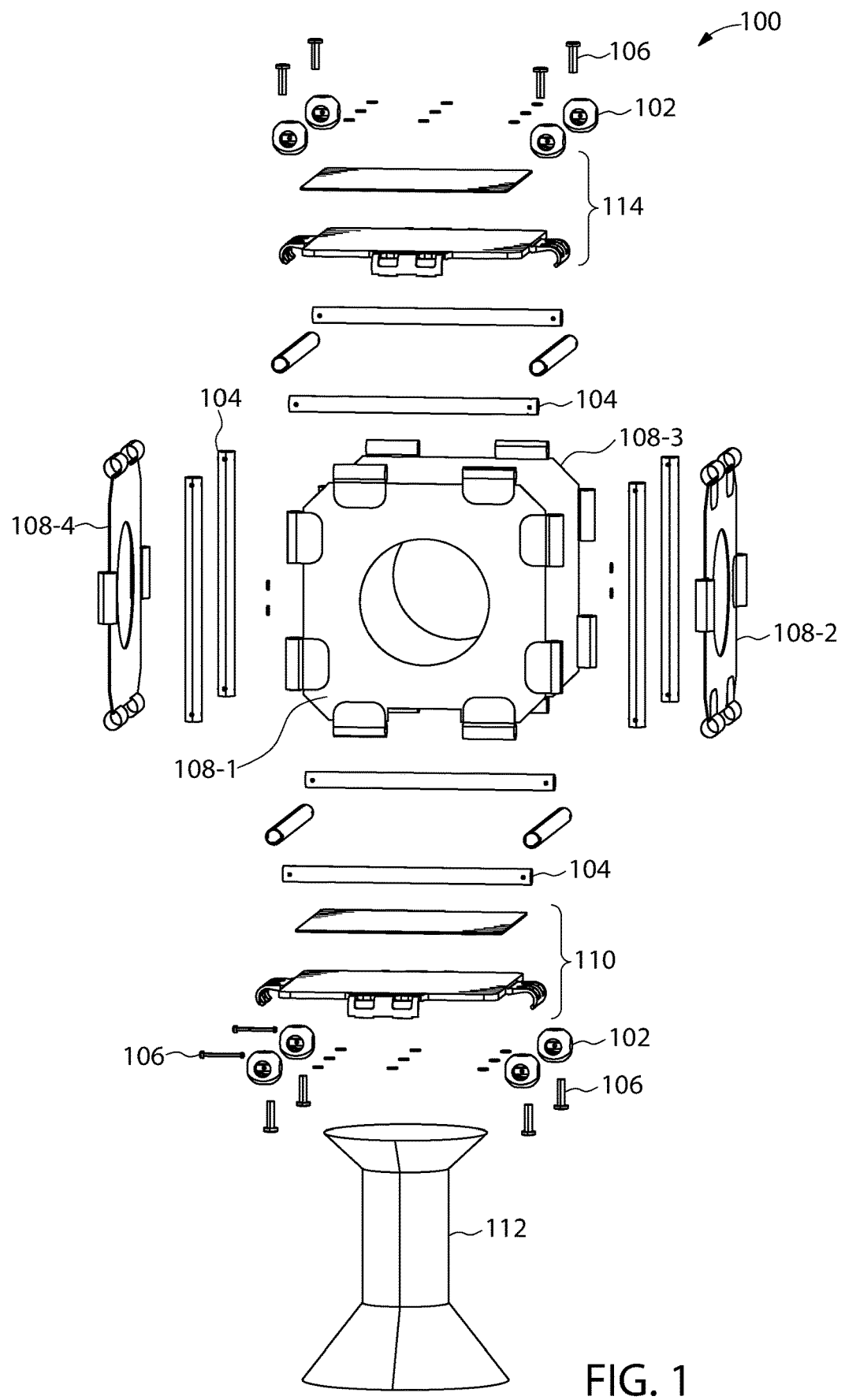
FIG. 1 illustrates an exploded view of an animal habitat assembly, in a first configuration, in accordance with some configurations of the present disclosure.

Referring now to FIG. 1, an exploded view of an example animal habitat assembly 100, in a first configuration, is illustrated in accordance with some configurations of the present disclosure. The animal habitat assembly 100 may include a plurality of connectors 102 (hereinafter, individually referred to as a connector 102 or collectively referred to as connectors 102) and a plurality of rods 104 (hereinafter, also individually referred to as a rod 104 and collectively referred to as rods 104). For example, as shown in FIG. 1, the animal habitat assembly 100 includes a set of eight connectors 102 and a set of twelve rods 104. It should be noted that in some configurations, lengths of all of the plurality of rods (e.g., rod 104) may be the same. In some configurations, each rod 104 and each connector 102 may be configured to receive a fastener 106 to fasten the rod 104 with the connector 102.

The animal habitat assembly 100 may further include at least one panel 108. For example, as shown in FIG. 1, the animal habitat assembly 100 may further include four panels 108-1, 108-2, 108-3, 108-4 (the panels may have been referred collectively or individually as panel(s) 108 in this disclosure). Each panel of the four panels may include four panel-edges. Each panel-edge of the four panel-edges may be configured to attach to an associated rod 104 of the plurality of rods.

The animal habitat assembly 100 may further include a bottom plate assembly 110. The animal habitat assembly 100 may further include a base 112, such that the bottom plate assembly 110 may be configured to be positioned over the base 112. The animal habitat assembly 100 may further include a top plate assembly 114. The connectors 102 and the rods 104 may be coupled together to form a prismatic structure, defining a bottom plane, at least three side planes, and a top plane. For example, the prismatic structure may be a cuboid structure defining a bottom plane, at four side planes, and a top plane. The connector 102, the rod 104, the fastener 106, the at least one panel 108, the bottom plate assembly 110, the base 112, and the top plate assembly 114 are explained subsequently in detail in subsequent sections of this disclosure.

Figure 2:
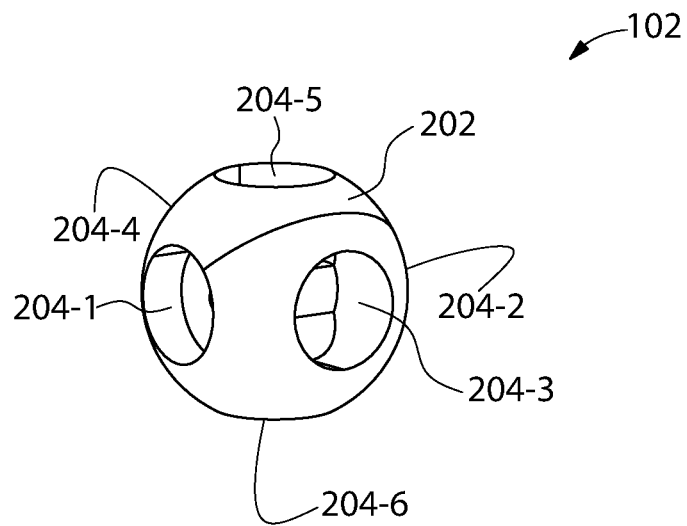
FIG. 2 illustrates a perspective view of a connector, in accordance with some configurations of the present disclosure.

Referring now to FIG. 2, a perspective view of the connector 102 is illustrated, in accordance with some configurations of the present disclosure. The connector 102 may include a body 202 and a plurality of coupling-holes 204-1, 204-2, . . . 204-n (hereinafter, collectively referred to as the plurality of coupling-holes 204) formed in the body 202. For example, the connector 102 may include at least three coupling-holes 204 oriented transverse to each other (e.g., the connector 102 may include three coupling-holes 204-1, 204-3, 204-5 oriented transverse to each other). It should be noted that each of the plurality of coupling-holes 204 of the connector 102 may have a circular cross-section or a polygonal cross-section, e.g., a hexagonal or a square cross-section.

In some configurations, for example as shown in FIG. 2, the connector 102 may include six holes 204-1, 204-2, 204-3, 204-4, 204-5, 204-6 (holes 204-2, 204-4, 204-6 not visible in FIG. 2). In other words, the connector 102 may include three pairs of coupling-holes—i.e., a first pair of coupling-holes 204-1, 204-2 formed in the body 202 and defined opposite to each other, a second pair of coupling-holes 204-3, 204-4 formed in the body 202 and defined opposite to each other, and a third pair of coupling-holes 204-5, 204-6 formed in the body 202 and defined opposite to each other. The first pair of coupling-holes 204-1, 204-2 may be oriented along the x-axis, the second pair of coupling-holes 204-3, 204-4 may be oriented along y-axis, and the third pair of coupling-holes 204-5, 204-6 may be oriented along z-axis.

In some configurations, the connector 102 may have a spherical shape, with the first pair, the second pair, and the third pair of the coupling-holes oriented along x-axis, y-axis, and z-axis, respectively. Alternatively, the connector 102 may have any other shape that allows for the first pair, the second pair, and the third pair of the coupling-holes to be oriented along x-axis, y-axis, and z-axis, respectively. For example, the connector 102 may have a cuboid shape having six faces, such that a coupling-hole of the first pair, the second pair, and the third pair of coupling-holes is defined at one of the six faces of the cuboid shape. The connector 102 may be manufactured from a rigid material selected from a metal, an alloy, a plastic, etc. Furthermore, the connector 102 may be manufactured from a sheet (i.e., hollow) or have a solid structure.

The rod 104 may be configured to couple with the connector 102 by tightly fitting into the coupling-hole of the connector 102. As such, the size of the coupling-hole (i.e., substantially the same as the size of the rod 104) is such to cause one end of the rod 104 to fit tightly into the coupling-hole of the connector 102.

Further, in some configurations, the connector 102 may be configured to receive the fastener 106 to fasten a rod 104 to the connector 102 once the rod 104 is coupled to the connector 102. By way of an example, the fastener 106 may be a screw. It should be noted that the connector 102 having a solid structure may include a central core, such that the fastener 106 passing through one of the plurality of coupling-holes 204 may be received and therefore fastened to the central core. In other configurations, the fastener 106 may be a nut-bolt assembly, a rivet, etc.

Figure 3:
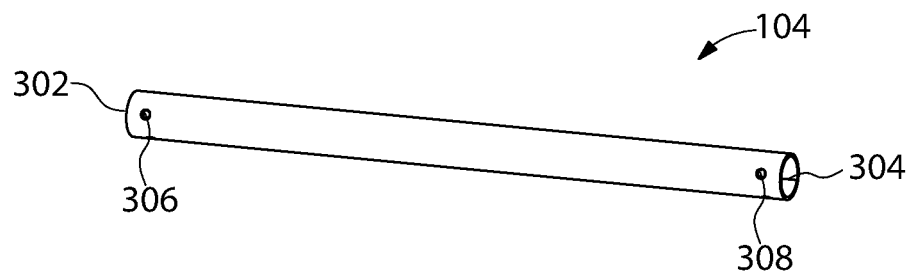
FIG. 3 illustrates a perspective view of a rod, in accordance with some configurations of the present disclosure.

Referring now to FIG. 3, a perspective view of the rod 104 is illustrated, in accordance with some configurations of the present disclosure, including a first end 302 and a second end 304. In some configurations, the rod 104 may be made of a rigid material selected from a metal, an alloy, a plastic, etc. It should be noted that the first end 302 and the second end 304 of the rod 104 are configured to fit into one of the plurality of coupling-holes 204 of the connector 102. To this end, as mentioned above, each of the plurality of coupling-holes 204 of the connector 102 may also have a similar cross-session as of rod 104, i.e., a circular cross-section or a polygonal cross-section, e.g., a hexagonal or a square cross-section. Further, the rod 104 may have a hollow construction or solid construction. An assembly of the connector 102 and rods 104 is shown in and explained via FIG. 4.

As mentioned herein, each rod 104 may be configured to receive the fastener 106 to fasten the rod 104 with the connector 102. In order to fasten the rod 104 with the connector 102, the rod 104 may include a first aperture 306 proximate to the first end 302 and a second aperture 308 proximate to the second end 304. For example, the rod 104 may be fastened to the connector 102 by passing the fastener 106 through the coupling-hole (into which the rod 104 is coupled) and one of the first aperture 306 and the second aperture 308 to be finally received in the central core of the connector 102. As mentioned above, the fastener 106 may be a screw, or alternately a nut-bolt assembly, or a rivet.

Figure 4:
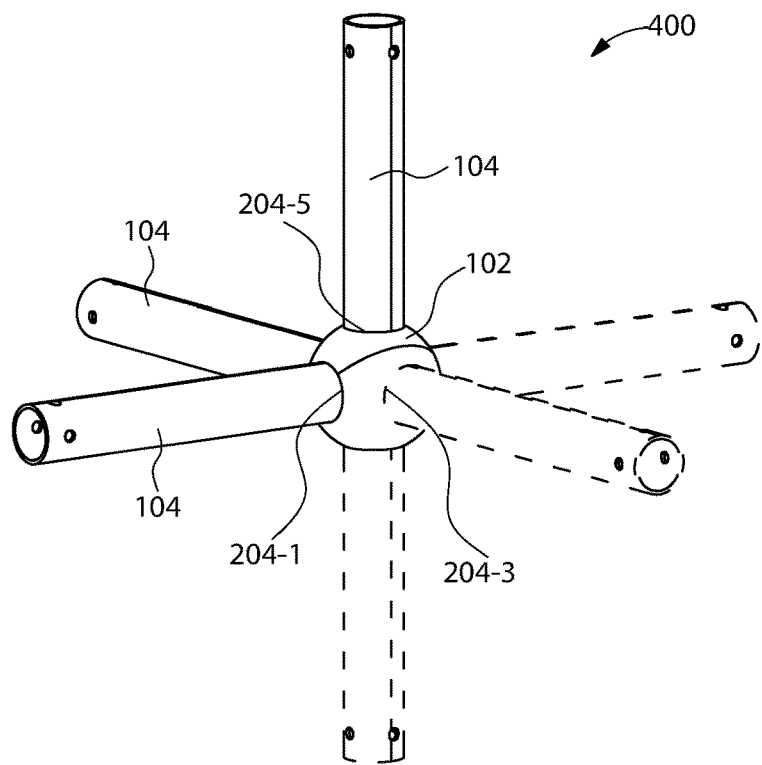
FIG. 4 illustrates a perspective view of an assembly of a connector and a plurality of rods, in accordance with some configurations of the present disclosure.

Referring now to FIG. 4, a perspective view of an assembly 400 of the connector 102 and the plurality of rods 104 is illustrated, in accordance with some configurations of the present disclosure. The connector 102 includes the six coupling-holes 204-1, 204-2, 204-3, 204-2, 204-4, 204-6 (coupling-holes 204-2, 204-4, 204-6 not visible in FIG. 4). Three rods 104 are coupled with the connector 102 via each of the coupling-holes 204-1, 204-3, 204-5 of the connector 102. It should be noted that the connector 102 may be configured to be coupled with a maximum of six rods 104 via the six coupling-holes 204-1, 204-2, 204-3, 204-2, 204-4, 204-6 at one time.

Figure 5:
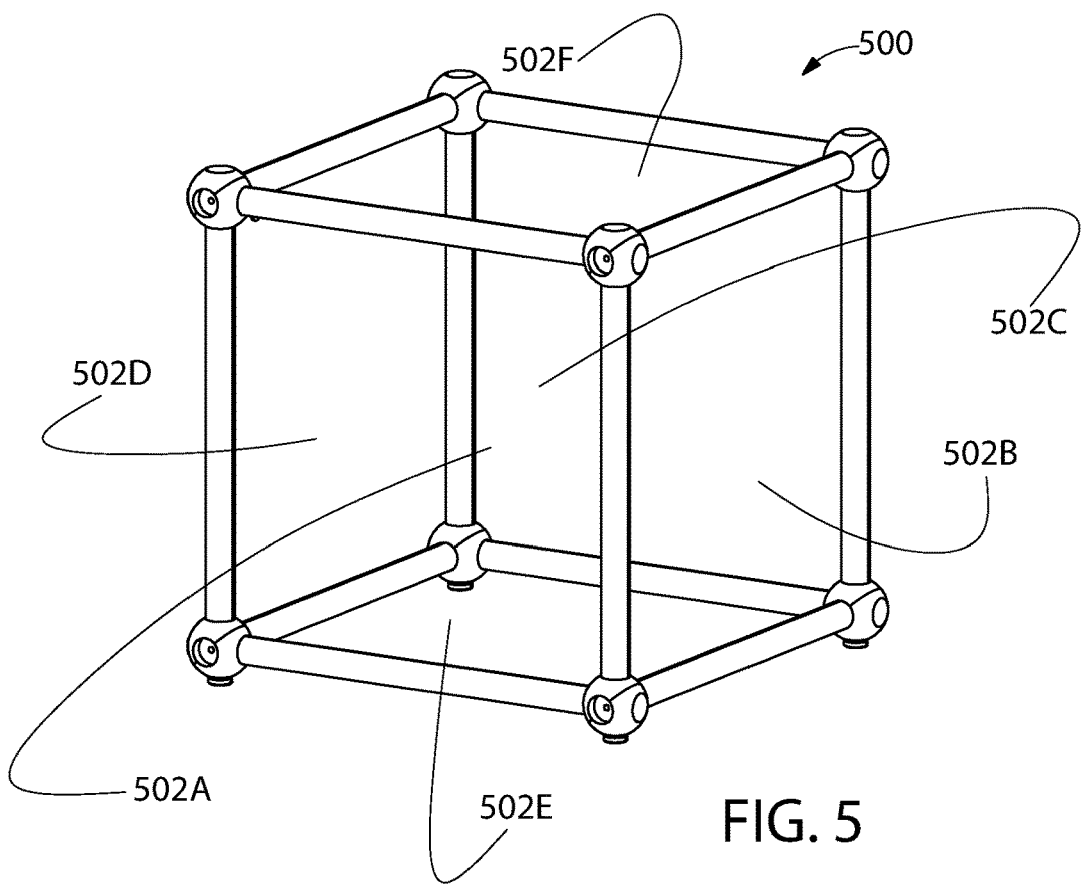
FIG. 5 illustrates a perspective view of a cuboid structure formed using eight connectors and twelve rods, in accordance with some configurations of the present disclosure.

Referring now to FIG. 5, a perspective view of a cuboid structure 500 formed using eight connectors 102 and twelve rods 104 (the animal habitat assembly 100) is illustrated in accordance with some configurations of the present disclosure. In other words, the cuboid structure 500 represents the animal habitat assembly 100 in its second configuration. In the second configuration, a set of rods 104 are coupled with a set of connectors 102 to form the cuboid structure 500 defining four side planes, a bottom plane, and a top plane. For example, as shown in FIG. 5, in the second configuration, a set of twelve rods 104 are coupled with a set of eight connectors 102 to form the cuboid structure 500. In particular, each connector 102 (of the set of eight connectors 102) is coupled with three rods 104 (of the set of eight rods 104), via three coupling-holes 204, to form the cuboid structure 500. The cuboid structure 500 defines four side planes 502A, 502B, 502C, 502D, a bottom plane 502E, and a top plane 502F. As will be understood, each of the four side planes 502A, 502B, 502C, 502D is defined by four rods 104 (of the set of twelve rods).

Figure 6A:
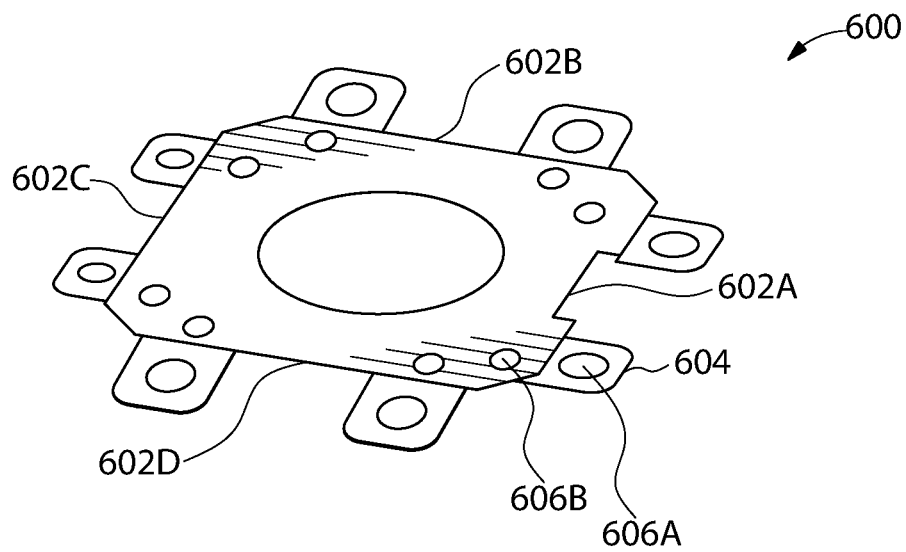
FIG. 6A illustrates a perspective view of a first type panel, in a first configuration, in accordance with some configurations of the present disclosure.

Referring now to FIG. 6A, a perspective view of a first type panel 600 (corresponding to the panels 108-1, 108-3), in a first configuration, is illustrated in accordance with some configurations of the present disclosure. As shown in the FIG. 6A, the first type panel 600 may include four panel-edges 602A, 602B, 602C, 602D—side panel-edges 602A, 602C, bottom panel-edge 602C, and a top panel-edge 602D. Further, each of the four panel-edges 602A, 602B, 602C, 602D may be configured to attach to an associated rod (not shown in FIGS. 6A-6B) of the plurality of rods 104. In some configurations, each of the four panel-edges 602A, 602B, 602C, 602D may be configured to attach to the associated rod via at least one fastener. To this end, each of the four panel-edges 602A, 602B, 602C, 602D may include at least one loop 604 configured to loop around the associated rod. In some configurations, the bottom panel-edge 602C and the top panel-edge 602D may include two loops 604 each. The side panel-edges 602A and 602C may also include two loops 604 each. Each loop 604 is configured to loop around the associated rod.

In some configurations, each loop 604 may include a top-half 606A of a snap-fastener 606. Further, the first type panel 600 may include a bottom-half 606B of the snap-fastener 606 configured to engage with the top-half 606A of the snap-fastener 606. By way of an example, the top-half 606A and the bottom-half 606B of the snap-fastener 606 may be based on any known in the art fastening mechanism (e.g., a button, hook-and-loop, permanent adhesive pad, washable/renewable adhesive pad, pins, hooks, clasps, rivets, screws, bolts, etc.). The top-half 606A and the bottom-half 606B of the snap-fastener 606 are configured to engage with each other to fasten the loop 604 with the first type panel 600 upon the loop 604 looping around the associated rod.

Figure 6B:
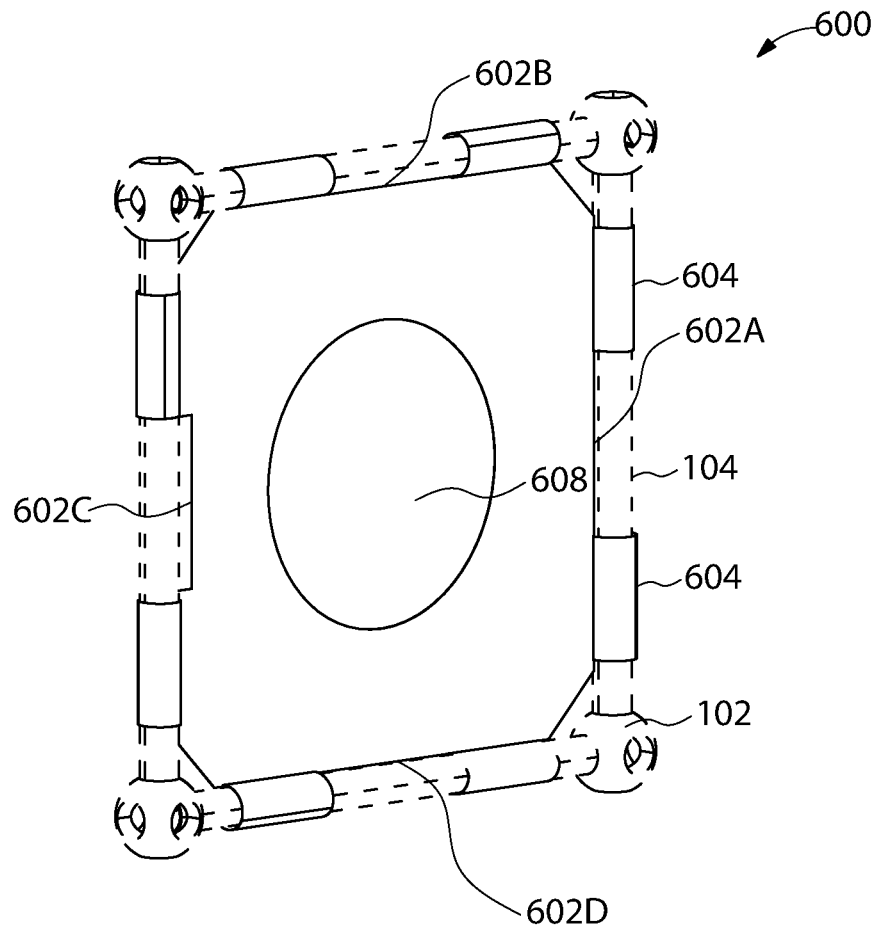
FIG. 6B illustrates a perspective view of the first type panel of FIG. 6A, in a second configuration, in accordance with some configurations of the present disclosure.

Referring now to FIG. 6B, a perspective view of the first type panel 600, in the second configuration of the animal habitat assembly 100, is illustrated, in accordance with some configurations of the present disclosure. As shown in the FIG. 6B, in the second configuration, the top-half 606A, and the bottom-half 606B of the snap-fastener 606 are engaged with each other to fasten the loop 604 with the first type panel 600 upon the loop 604 looping around the associated rod 104 (shown in dotted lines in FIG. 6B). As will be understood, once the connectors 102 and the rods 104 are coupled with each other to form the cuboid stricture 500 defining four side planes 502A, 502B, 502C, 502D, the first type panel 600 may be fastened along one or both of the side planes 502A, 502C. For example, the first type panel 600 may be fastened by attaching each of the four panel-edges 602A, 602B, 602C, 602D to an associated rod 104 of the four rods defining the associated side planes 502A, 502C.

In some illustrative configurations, as shown in FIGS. 6A-6B, the first type panel 600 may include an opening 608 that may be circular in shape defined, for example, defined in the center of the panel 108. The size of the opening 608 may be such to allow an animal (e.g., a cat) to pass through the opening 608. In some configurations, the first type panel 600 may be manufactured from a flexible material. For example, the panel 108 may be manufactured from fabric or plastic. While the term 'animal' is used throughout this disclosure, it is to be understood that any type/breed of domesticated animals may utilize this animal habitat assembly 100. For example, cats, dogs, ferrets, hamsters, chickens, guinea pigs, etc., may use the animal habitat assembly 100.

Figure 7A:
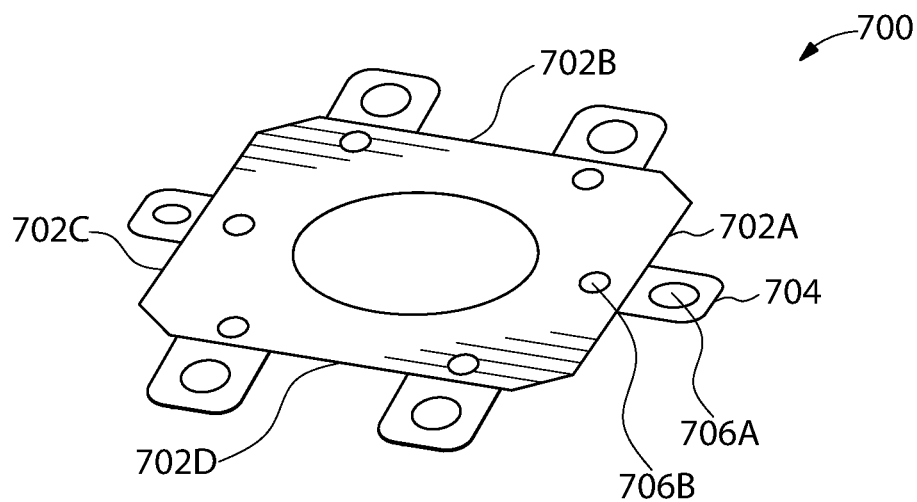
FIG. 7A illustrates a perspective view of a second type panel, in a first configuration, in accordance with some configurations of the present disclosure.

Referring now to FIG. 7A, a perspective view of a second type panel 700 (corresponding to the panels 108-2, 108-4), in a first configuration, is illustrated, in accordance with some configurations of the present disclosure. As shown in the FIG. 7A, the second type panel 700 may include four panel-edges 702A, 702B, 702C, 702D— side panel-edges 702A, 702C, bottom panel-edge 702C, and a top panel-edge 702D. Further, each of the four panel-edges 702A, 702B, 702C, 702D may be configured to attach to an associated rod (not shown in FIGS. 7A-7B) of the plurality of rods 104. In some illustrative configurations, each of the four panel-edges 702A, 702B, 702C, 702D may be configured to attach to the associated rod via at least one snap-fastener. To this end, each of the four panel-edges 702A, 702B, 702C, 702D may include at least one loop 704 configured to loop around the associated rod. In some configurations, the bottom panel-edge 702C, and the top panel-edge 702D may include two loops 704 each. The side panel-edges 702A, 702C also include one loop 704 each. Each loop 704 is configured to loop around the associated rod.

In some configurations, each loop 704 may include a top-half 707A of a snap-fastener 707. Further, the second type panel 700 may include a bottom-half 707B of the snap-fastener 707 configured to engage with the top-half 707A of the snap-fastener 707. By way of an example, the top-half 707A and the bottom-half 707B of the snap-fastener 707 may be based on any known in the art fastening mechanism (e.g., a button). The top-half 707A and the bottom-half 707B of the snap-fastener 707 are configured to engage with each other to fasten the loop 704 with the second type panel 700 upon the loop 704 looping around the associated rod.

Figure 7B:
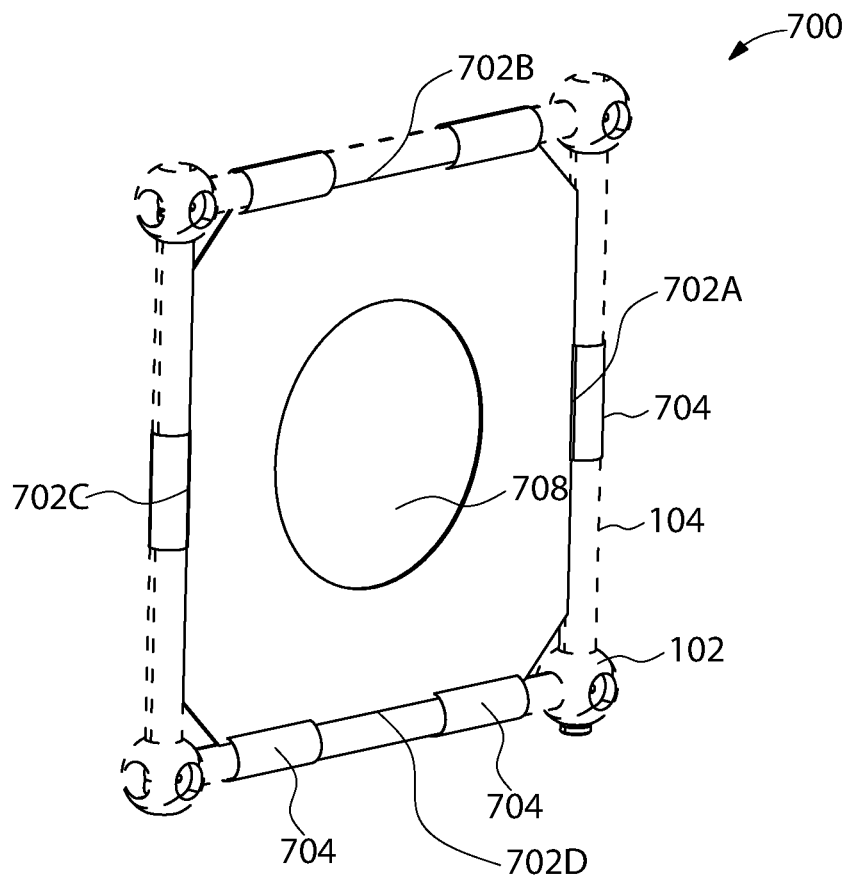
FIG. 7B illustrates a perspective view of the second type panel of FIG. 7A, in a second configuration, in accordance with some configurations of the present disclosure.

Referring now to FIG. 7B, a perspective view of the second type panel 700, in the second configuration of the animal habitat assembly 100, is illustrated, in accordance with some configurations of the present disclosure. As shown in the FIG. 7B, in the second configuration, the top-half 707A and the bottom-half 707B of the snap-fastener 707 are engaged with each other to fasten the loop 704 with the second type panel 700 upon the loop 704 looping around the associated rod 104 (shown in dotted lines in FIG. 7B). As will be understood, once the connectors 102 and the rods 104 are coupled with each other to form the cuboid stricture 500 defining four side planes 502A, 502B, 502C, 502D, the second type panel 700 may be fastened along one or both of the side planes 502B, 502D. For example, the second type panel 700 may be fastened by attaching each of the four panel-edges 702A, 702B, 702C, 702D to an associated rod 104 of the four rods defining the associated side planes 502B, 502D.

In some illustrative configurations, as shown in FIGS. 7A-7B, the second type panel 700 may include an opening 708 that may be circular in shape defined, for example, defined in the center of the panel 107. The size of the opening 708 may be such to allow an animal (e.g., a cat) to pass through the opening 708. In some configurations, the second type panel 700 may be manufactured from a flexible material. For example, the panel 107 may be manufactured from fabric or plastic.

Figure 8:
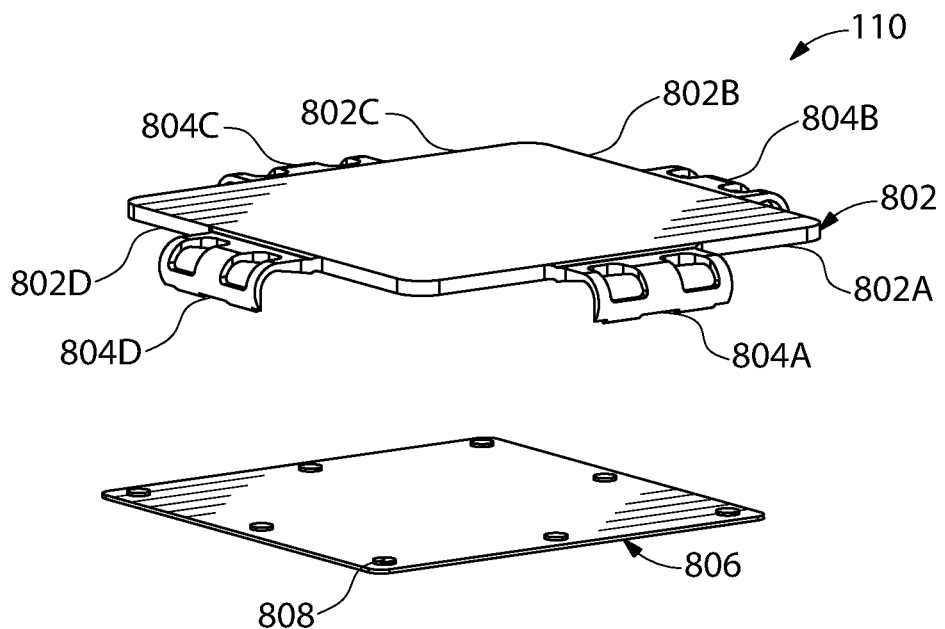
FIG. 8 illustrates a perspective view of a bottom plate assembly, in accordance with some configurations of the present disclosure.

Referring now to FIG. 8, a perspective view of the bottom plate assembly 110 is illustrated, in accordance with some configurations of the present disclosure. The bottom plate assembly 110 may include a bottom plate 802. In some configurations, the bottom plate 802 may have a substantially square shape. However, in alternate configurations, the bottom plate 802 may have any other shape as well, for example, a rectangular shape. Further, in some configurations, the bottom plate 802 may have a polygonal shape, for example, a triangular or a pentagonal shape. As shown in FIG. 8, the bottom plate 802 may have a substantially square shape that includes four plate-edges 802A, 802B, 802C, 802B.

The bottom plate 802 may be made of a rigid material, for example, a plastic, a metal, an alloy, etc. Further, the bottom plate 802 may be manufactured by extrusion, molding, or cut from a sheet.

The bottom plate 802 may be configured to be attached to four rods 104 defining the bottom plane 502E of the cuboid structure 500. To this end, the bottom plate 802 may include at least one bracket 804 provided at each of the four plate-edges 802A, 802B, 802C, 802D. As shown in FIG. 8, a bracket 804A is provided at the plate-edge 802A, a bracket 804B is provided at the plate-edge 802B, a bracket 804C is provided at the plate-edge 802C, and a bracket 804D is provided at the plate-edge 802D (the brackets 804A, 804B, 804C, 804D may also have been collectively referred to as brackets 804 or individually as bracket 804 in this disclosure). Each of the brackets 804 may be configured to engage with a rod 104 of the four rods defining the bottom plane 502E to attach the bottom plate 802 to the rods.

Each of the brackets 804A, 804B, 804C, 804D, in some configurations, may be formed within the bottom plate 802, i.e., is a part of the bottom plate 802, and therefore may be made of the same material as the bottom plate 802. Alternatively, in some configurations, each of the brackets 804A, 804B, 804C, 804D may be manufactured separately and then attached to the four plate-edges 802A, 802B, 802C, 802D, respectively. For example, each of the brackets 804A, 804B, 804C, 804D may be attached to the four plate-edges 802A, 802B, 802C, 802D via welding or using one or more fasteners including, but not limited to, screws, but-bolt assemblies, rivets, etc.

As can be seen in FIG. 8, each of the brackets 804A, 804B, 804C, 804D may have a claw-like shape. As will be understood, the claw-like shape may allow the bracket 804 to fit into a cylindrical shape of the associated rod 104 (of the four rods of the bottom plane 502E) on which the bottom plate 802 is to be attached.

The bottom plate 802 may be configured to provide a foundation within the structure (e.g., the cuboid structure 500) assembled using the animal habitat assembly 100 for the animal. As such, the bottom plate 802 may have sufficient strength to bear the weight of the animal while the animal may be resting or moving on the bottom plate 802.

In some configurations, as shown in FIG. 8, the bottom plate assembly 110 may additionally include a bottom sheet 806. The bottom sheet 806 may be configured to be attached to the bottom plate 802. In some configurations, the bottom sheet 806 may be configured to be attached to the bottom plate 802 via one or more fasteners 808 provided on the bottom sheet 806. For example, the one or more fasteners 808 may include magnets that may attach to a corresponding metal/magnet provided on the bottom plate. The bottom sheet 806 may be therefore attached to the bottom plate 802 upon assembling the animal habitat assembly 100 (i.e., when the animal habitat assembly 100 is in the second configuration), and upon mounting the bottom plate 802 on the rods 104 defining the bottom plane 502E of the structure 500. Alternatively, the bottom sheet 806 may be permanently attached to the bottom plate 802 via welding, gluing (i.e., using an adhesive), etc., and therefore mounted along with the bottom plate 802.

The bottom sheet 806 may be made of any rigid material like plastic, structural metal, or metal alloy, etc. It should be noted that the bottom sheet 806 may provide additional strength to the foundation provided by the bottom plate 802. Additionally, the bottom sheet 806 may be made of material suited for the animal's comfort. For example, the bottom sheet 806 may be made of fabric.

Figure 9:
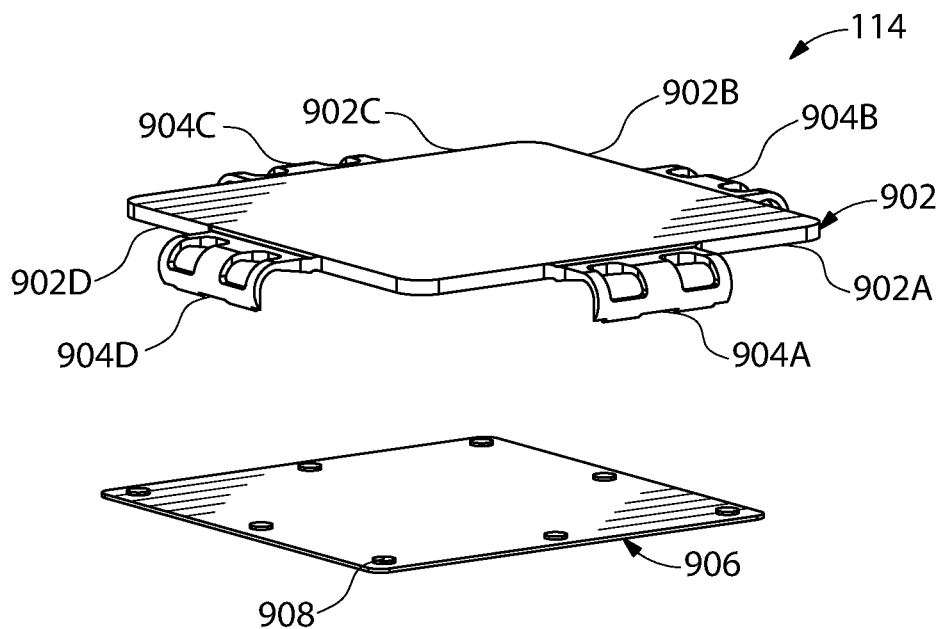
FIG. 9 illustrates a perspective view of a top plate assembly, in accordance with some configurations of the present disclosure.

Referring now to FIG. 9, a perspective view of the top plate assembly 114 is illustrated, in accordance with some configurations of the present disclosure. The top plate assembly 114 may include a top plate 902, which may be similar to the bottom plate 702. In some configurations, the top plate 902 may have a substantially square shape, a rectangular shape, or a polygonal shape like a triangular or a pentagonal shape. As shown in FIG. 9, the top plate 902 has a substantially square shape and includes four plate-edges 902A, 902B, 902C, 902B. The top plate 902 may be made of a rigid material, for example, a plastic, a metal, an alloy, etc. Further, the top plate 902 may be manufactured by extrusion, molding, or cut from a sheet.

The top plate 902 may be configured to be attached to four rods 104 defining the top plane 502F of the cuboid structure 500. To this end, top plate 902 may include at least one bracket 904 provided at each of the four plate-edges 902A, 902B, 902C, 902D. As shown in FIG. 9, a bracket 904A is provided at the plate-edges 902A, a bracket 904B is provided at the plate-edges 902B, a bracket 904C is provided at the plate-edges 902C, and a bracket 904D is provided at the plate-edges 902D. Each of the at least one bracket may be configured to engage with a rod 104 of the four rods defining the top plane 502F to attach the top plate 902 to the four rods.

Each of the brackets 904A, 904B, 904C, 904D, in some configurations, may be formed within the top plate 902, i.e., is a part of the top plate 902, and therefore may be made of the same material as the top plate 902. Alternatively, in some configurations, each of the brackets 904A, 904B, 904C, 904D may be manufactured separately and then attached to the four plate-edges 902A, 902B, 902C, 902D, respectively. For example, each of the brackets 904A, 904B, 904C, 904D may be attached to the four plate-edges 902A, 902B, 902C, 902D via welding or using one or more fasteners including, but not limited to, screws, but-bolt assemblies, rivets, etc.

As can be seen in FIG. 9, each of the brackets 904A, 904B, 904C, 904D may have a claw-like shape. As will be understood, the claw-like shape may allow the bracket to fit into a cylindrical shape of the associated rod 104 (of the four rods of the top plane 502F) on which the top plate 902 is to be attached.

The top plate 902 may be configured to provide a shelter within the structure, e.g., the cuboid structure 500. Additionally, the top plate 902 may be configured to provide a foundation for another structure (similar to the cuboid structure 500) assembled and positioned above the cuboid structure 500. As such, the top plate 902 may also have sufficient strength to bear the weight of the animal while the animal may be resting or moving on the top plate 902.

In some configurations, as shown in FIG. 9, the top plate assembly 114 may additionally include a top sheet 906. The top sheet 906 may be configured to be attached to the top plate 902. In some configurations, the top sheet 906 may be configured to be attached to the top plate 902 via one or more fasteners 908 (similar to the fasteners 808) provided on the top sheet 906. The top sheet 906 may be attached to the top plate 902 upon assembling the animal habitat assembly 100 (i.e., when the animal habitat assembly 100 is in the second configuration) and upon mounting the top plate 902 on the rods 104 defining the top plane 502F of the structure 500. Alternatively, the top sheet 906 may be permanently attached to the top plate 902 via welding, gluing (i.e., using an adhesive), etc.

The top sheet 906 may be made of any rigid material like plastic, metal, or an alloy, etc. It should be noted that the secondary top plate 906 may provide for additional strength to the foundation provided by the top plate 902. Alternatively, the top sheet 906 may be made of material suited for the animal's comfort. For example, the top sheet 906 may be made of fabric.

Figure 10A:
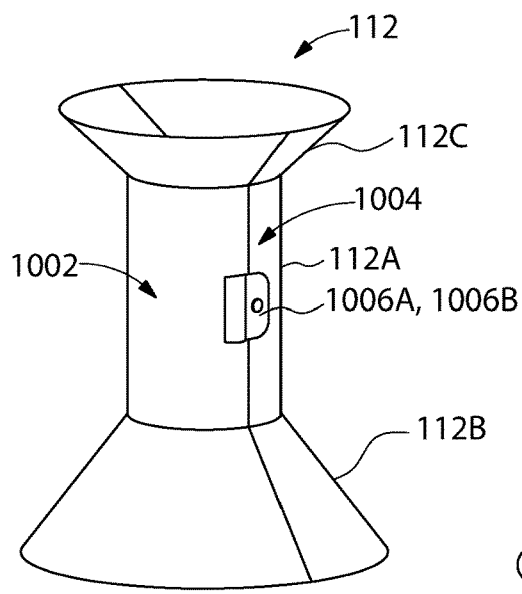
FIG. 10A illustrates a perspective view of a base, in a second configuration, in accordance with some configurations of the present disclosure.

Referring now to FIG. 10A, a perspective view of the base 112, in a second configuration, is illustrated, in accordance with some configurations of the present disclosure. The base 112 may be configured to support the structure (e.g., cuboid structure 500) formed using the animal habitat assembly 100 (i.e., in the second configuration of the animal habitat assembly 100). In particular, the bottom plate assembly 110 may be configured to be positioned over the base 112. In some configurations, as shown in FIG. 10A, the base 112 may be an elongated structure including a hollow cylindrical portion 112A, a bottom frustrum portion 112B defined at a bottom end of the hollow cylindrical portion 112A, and a top frustrum portion 112C defined at a top end of the hollow cylindrical portion 112A. The base 112 may therefore act as a tower upon which the cuboid structure 500 can be mounted for providing an elevation to the cuboid structure 500 from the ground. As will be understood, this may add another dimension to the recreational utility of the animal habitat. The animal may have to jump upwards and downwards to enter and exit, respectively, the cuboid structure 500. In some illustrative configurations, the base 112 may be collapsible so as to make it more compact for easy storage and transportation. In other words, the base 112 is configurable between the first configuration and the second configuration.

In some configurations, the base 112 may include a first half longitudinal section 1002 and a second half longitudinal section 1004. The first half longitudinal section 1002 and the second half longitudinal section 1004 are configured to engage with each other (in the second configuration) to together define the hollow cylindrical portion 112A, the bottom frustrum portion 112B, and the top frustrum portion 112C of the base 112.

Figure 10B:
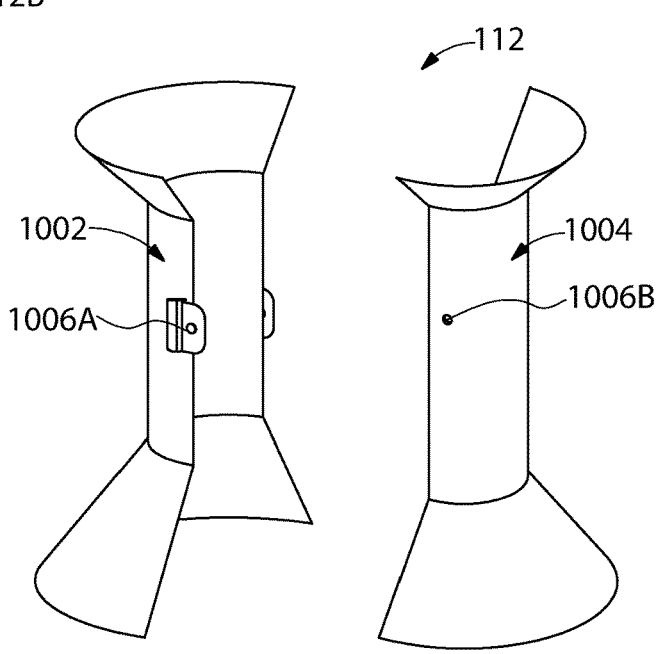
FIGS. 10B-10C illustrate perspective views of the base of FIG. 10A, in a first configuration, in accordance with some configurations of the present disclosure.
Figure 10C:
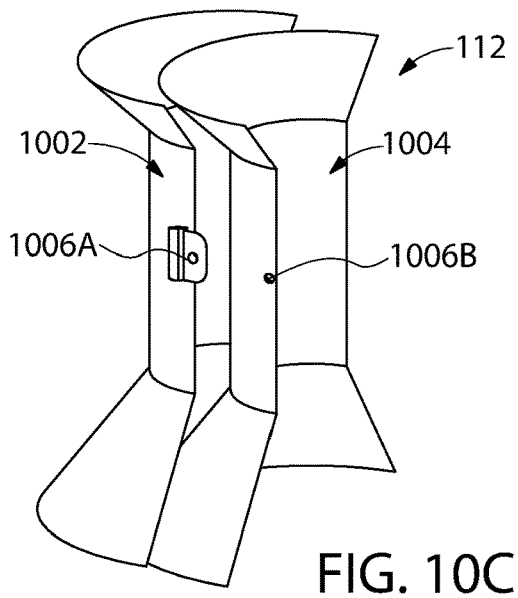

Referring now to FIGS. 10B-10C, perspective views of the base 112, in a first configuration, are illustrated, in accordance with some configurations of the present disclosure. As shown in FIG. 10B, in the first configuration, the first half longitudinal section 1002 and the second half longitudinal section 1004 are disengaged from each other. Further, as shown in FIG. 10C, in the first configuration, the first half longitudinal section 1002 may be configured to collapse into the second half longitudinal section 1104. To this end, the first half longitudinal section 1002 and the second half longitudinal section 1004 are sized and shaped the same as each other to allow the collapse. The collapsibility of the base 112 provides for easy storage and transportation of the base 112 and, therefore, the animal habitat assembly 100.

In the second configuration, as shown in the FIG. 10A, the first half longitudinal section 1002 and the second half longitudinal section 1004 are engaged with each other to define the hollow cylindrical portion 112A, the bottom frustrum portion 112B, and the top frustrum portion 112C. To this end, each of the first half longitudinal section 1002 and the second half longitudinal section 1004 may include engaging members that are configured to engage with each other. For example, as shown in FIGS. 10B-10C, the first half longitudinal section 1002 and the second half longitudinal section 1004 include a first locking member 1006A and a second locking member 1006B, respectively, which are configured to engage with each other to cause the first half longitudinal section 1002 and the second half longitudinal section 1004 to engage with each other. In other examples, the first half longitudinal section 1002 and the second half longitudinal section 1004 include a different mechanism for causing the first half longitudinal section 1002 and the second half longitudinal section 1004 to engage with each other. For example, the first half longitudinal section 1002 and the second half longitudinal section 1004 may include a first sliding member and a second sliding member, respectively, defined along a part of the length of the first half longitudinal section 1002 and the second half longitudinal section 1004. The first sliding member may be configured to slide into the second sliding member, to cause the first half longitudinal section 1002 and the second half longitudinal section 1004 to engage with each other. It should be noted that any other locking mechanism may be used as well without digressing from the scope of the present subject matter for causing to engage the first half longitudinal section 1002 and the second half longitudinal section 1004 with each other.

Further, in some configurations, the first longitudinal section 1002 may be attached to the second half longitudinal section 1004 via a hinged connection. As such, in the first configuration, the first longitudinal section 1002 and the second half longitudinal section 1004 may be oriented at 180 degrees to each other. In the second configuration, the first longitudinal section 1002 and the second half longitudinal section 1004 may be rotated about the hinged connection to align opposite to each other to thereby define the hollow cylindrical portion 112A, the bottom frustrum portion 112B, and the top frustrum portion 112C of the base 112.

In some configurations, each of the first half longitudinal section 1002 and the second half longitudinal section 1004 may be made from rigid material, for example, a plastic, a metal, an alloy, etc. having sufficient strength to support the weight of the structure (e.g., the cuboid structure 500) formed using the animal habitat assembly 100.

In some configurations, a bottom surface 1008 of the base 112, or in particular, a bottom surface 1008 of the bottom frustrum portion 112B, may include high friction lining for allowing the base to be held at one position on the ground surface. In other words, high friction lining may prevent the base from being easily dislodged when the animal is moving within or close to the animal habitat assembly 100 (in its second configuration).

Figure 11:
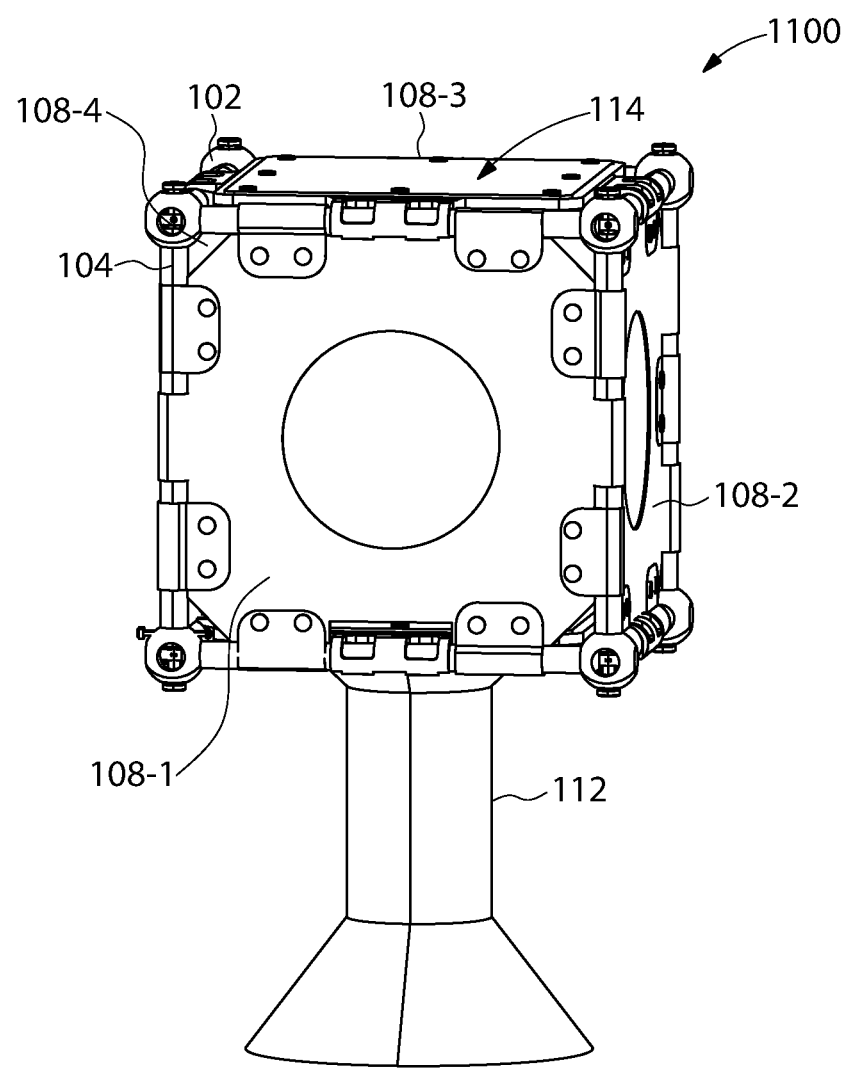
FIG. 11 illustrates a perspective view of an animal habitat, in the second configuration, in accordance with another configuration of the present disclosure.

Referring now to FIG. 11, a perspective view of an animal habitat 1100 corresponding to the animal habitat assembly 100 in the second configuration is illustrated in accordance with some configurations of the present disclosure. The animal habitat assembly 1100 is assembled from the set of eight connectors 102 and the set of twelve rods 104. The set of twelve rods 104 may be coupled with the set of eight connectors 102 to form the cuboid structure 500 defining four side planes 502A, 502B, 502C, 502D, the bottom plane 502E, and the top plane 502F, as already explained in conjunction with FIG. 5. As shown in FIG. 11, each connector 102 (of the set of eight connectors) is coupled to three rods 104 (of the set of twelve rods) via three coupling-holes of the connector 102. Although, it should be noted that the connector 102 may be configured to be coupled with a maximum of six rods 104 via the six coupling-holes 204 at one time. In some example configurations, each rod 104 may be coupled with the associated connector 102 using the fastener 106 via the first aperture 306 and the second aperture 308 associated with each rod 104. As mentioned above, the fastener 106 may be a screw, a nut-bolt assembly, a rivet, etc.

The animal habitat 1100 further includes the least one panel 108. In particular, as shown in FIG. 11, the animal habitat 1100 includes four panels 108-1, 108-2, 108-3, 108-4 (panel 108-4 not visible in FIG. 11). It should be noted that a maximum of four panels 108 may be used at one time, i.e., a user may choose to use one, two, three, or all four panels 108 as per their desirability. Further, the panels 108-1, 108-3 along the side planes 502A, 502C may be first type panels 600, and the panels 108-2, 108-4 along the side planes 502B, 502D may be second type panels 700. Each panel 108 includes four panel-edges to be attached to an associated rod of the set of twelve rods 104, via at least one snap-fastener 606, 706, as explained in conjunction with FIGS. 6-7. For the first type panel 600, the bottom panel-edge 602C, the top panel-edge 602D, and the side panel-edges 602A, 602C include two loops 604 each, each loop 604 configured to loop around the associated rod. Each loop 604 includes the top-half 606A of the snap-fastener 606. Further, the first type panel 600 includes the bottom-half 606B of the snap-fastener 606 configured to engage with the top-half 606A of the snap-fastener 606. The top-half 606A and the bottom-half 606B of the snap-fastener 606 are configured to engage with each other to fasten the loop 604 with the first type panel 600 upon the loop 604 looping around the associated rod. For the second type panel 700, the bottom panel-edge 702C and the top panel-edge 702D include two loops 704 each, and the side panel-edges 702A, 702C include one loop 704 each, each loop 704 configured to loop around the associated rod. Each loop 704 includes the top-half 707A of the snap-fastener 707. Further, the second type panel 700 includes the bottom-half 707B of the snap-fastener 707 configured to engage with the top-half 707A of the snap-fastener 707. The top-half 707A and the bottom-half 707B of the snap-fastener 707 are configured to engage with each other to fasten the loop 704 with the second type panel 700 upon the loop 704 looping around the associated rod. Once the connectors 102 and the rods 104 are coupled with each other to form the cuboid structure 500 defining four side planes, at least one of the four panels 108-1, 108-2, 108-3, 108-4 may be fastened to the cuboid structure 500, by attaching each of the four panel-edges of the panel 108 to an associated rod 104 of the four rods defining a side plane.

The animal habitat 1100 may further include the bottom plate assembly 110 configured with the bottom plate 802 and the bottom sheet 804. Each of the bottom plate 802 and the bottom sheet 804 has a substantially square shape. The bottom plate 802 includes the four plate-edges 802A, 802B, 802C, 802B. The bottom plate 802 may be attached to four rods 104 defining the bottom plane 502E (of the cuboid structure 500), via brackets 804A, 804B, 804C, 804D provided at the four plate-edges 802A, 802B, 802C, 802D. Each of the brackets 804A, 804B, 804C, 804D is engaged with a rod 104 of the four rods 104 defining the bottom plane 502E to attach the bottom plate 802 to these four rods 104. Further, owing to the claw-like shape, the brackets 804A, 804B, 804C, 804D may easily fit into the cylindrical shape of the associated rod 104 on which the bottom plate 802 is to be attached.

It should be noted that, as shown in FIG. 11, each of the brackets 804A, 804B, 804C, 804D may be shaped and sized such that the bracket fits between the two loops 604 looping around the associated rod 104, without there being overlap between the bracket and the two loops 604.

The bottom plate 802 provides the foundation within the structure (i.e., the cuboid structure 500) and, therefore, may have sufficient strength to bear the weight of the animal while the animal may be resting or moving on the bottom plate 802. Further, the bottom sheet 806 is attached to the bottom plate 802, for example, via one or more fasteners (e.g., fasteners 809, as explained earlier). The bottom sheet 806 may be attached to the bottom plate 802 upon assembling the animal habitat assembly 100 and upon mounting the bottom plate 802 on the rods 104 defining the bottom plane 502E of the structure 500, or the bottom sheet 806 may be permanently attached to the bottom plate 802.

The animal habitat 1100 further includes the top plate assembly 114, which includes include the top plate 902 similar to the bottom plate 802. The top plate 902 is attached to four rods 104 defining the top plane 502F of the cuboid structure 500, via brackets 904A, 904B, 904C, 904D provided at the four plate-edges 902A, 902B, 902C, 902D, respectively. Each bracket may be configured to engage with a rod 104 of the four rods defining the top plane 502F to attach the top plate 902 to the four rods. Further, owing to the claw-like shape, the brackets 904A, 904B, 904C, 904D fit into a cylindrical shape of the associated rod 104 (of the four rods of the top plane 502F) on which the top plate 902 is to be attached.

Further, each of the brackets 904A, 904B, 904C, 904D may be shaped and sized such that the bracket fits between the two loops 604 looping around the associated rod 104, without there being overlap between the bracket and the two loops 604.

The top plate 902 may provide a shelter within the structure, e.g., the cuboid structure 500, and additionally provide a foundation for another structure (similar to the cuboid structure 500) assembled and positioned above the cuboid structure 500. As such, the top plate 902 may also have sufficient strength to bear the weight of the animal while the animal may be resting or moving on the top plate 902. The top plate assembly 114 may additionally include the top sheet 906 configured to be attached to the top plate 902.

The animal habitat 1100 further includes the base 112 to support the structure 500. The bottom plate 110 may be positioned over the base 112. As shown in FIG. 11 and as explained in conjunction with FIGS. 10A-10C, the base 112 may be an elongated structure including the hollow cylindrical portion 112A, the bottom frustrum portion 112B defined at the bottom end of the hollow cylindrical portion 112A, and the top frustrum portion 112C defined at the top end of the hollow cylindrical portion 112A. The base 112 acts as a tower upon which the cuboid structure 500 is mounted for providing an elevation to the cuboid structure 500 from the ground.

Further, as already explained above, the base 112 includes the first half longitudinal section 1002, which in the first configuration of the animal habitat assembly 100 may be configured to collapse into the second half longitudinal section 1104. In the second configuration of the animal habitat assembly 100, as shown in FIG. 11, the first half longitudinal section 1002 and the second half longitudinal section 1004 are engaged with each other to define the hollow cylindrical portion 112A, the bottom frustrum portion 112B, and the top frustrum portion 112C. In some configurations, the bottom surface of the base 112, or in particular, a bottom surface of the bottom frustrum portion 112B, may include high friction lining for allowing the base to be held at one position on the ground surface.

In some configurations, the animal habitat assembly 1100 may include clips or hangers that can be attached to the structure (i.e., animal habitat assembly 1100 in the second configuration). These clips or hangers can be used to secure the animal habitat assembly 1100 to a wall or a door of the building.

Figure 12A:
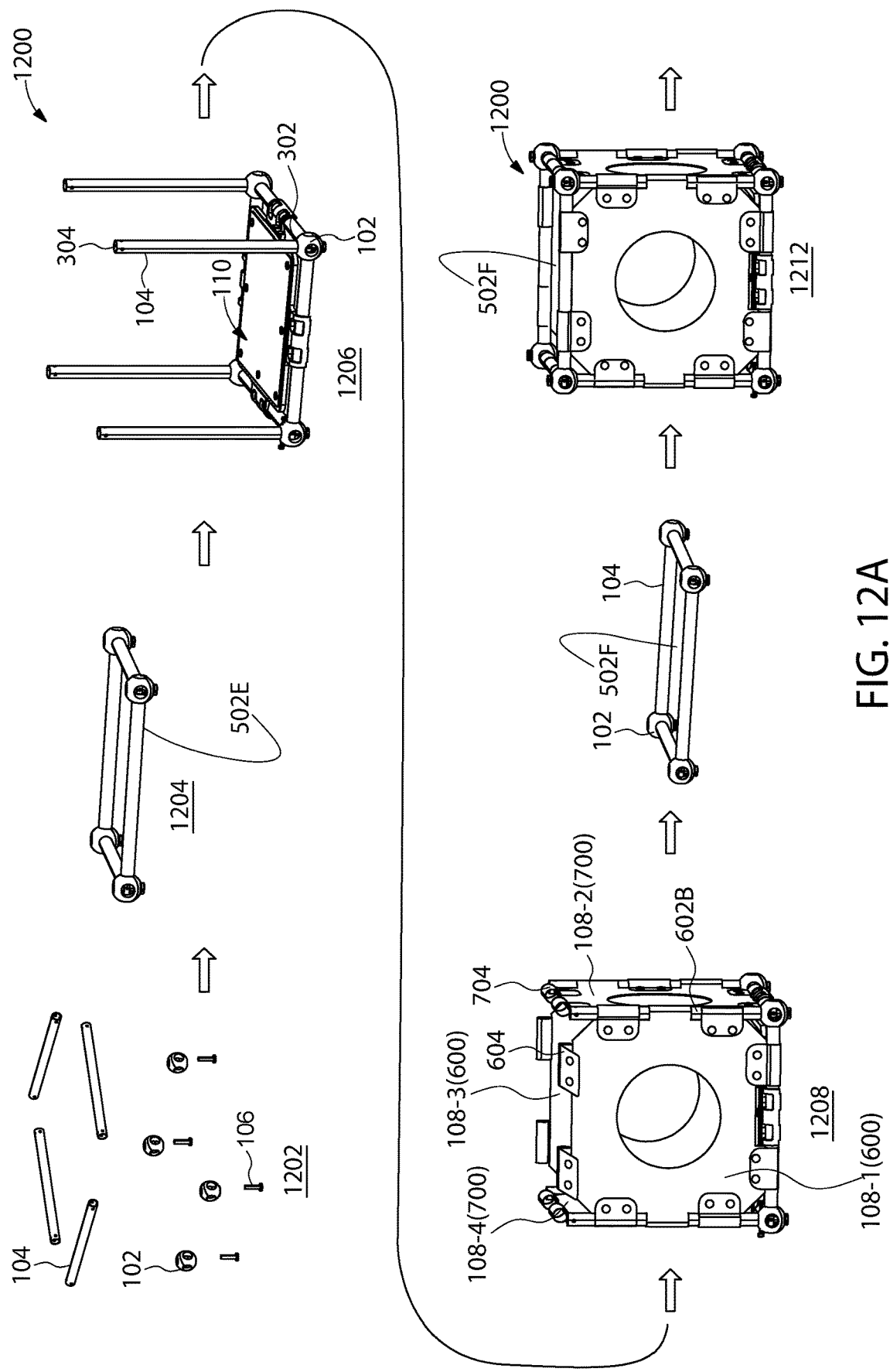
FIG. 12A-12B illustrate a process of creating the animal habitat of FIG. 11, in accordance with some configurations of the present disclosure.
Figure 12B:
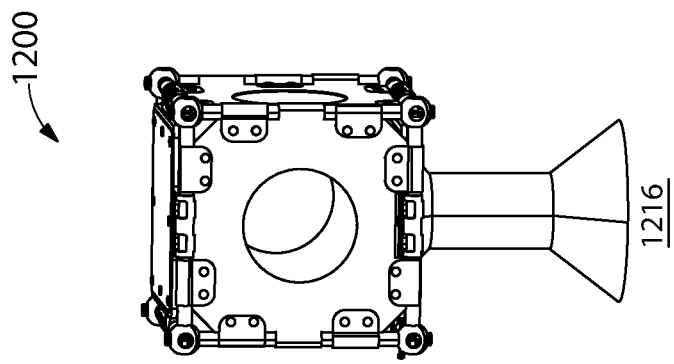
Figure 12B:
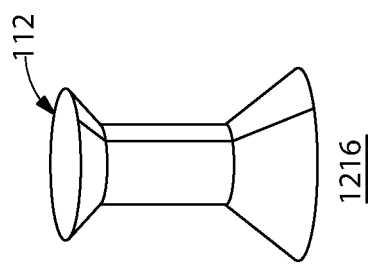
Figure 12B:
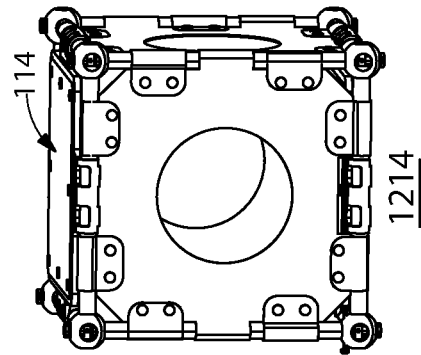

Referring now to FIG. 12A-12B, a process 1200 of creating the animal habitat 1100 from the animal habitat assembly 100 is illustrated, in accordance with some configurations of the present disclosure. The animal habitat assembly 1100 is assembled from the set of eight connectors 102 and the set of twelve rods 104.

At step 1202, four rods 104 (of the set of twelve rods 104) and four connectors 102 (of the set of four connectors 102) are received. Additionally, fasteners 106 may be received at step 1202. At step 1204, the four rods 104 may be coupled with the four connectors 102, by coupling two rods with two coupling-holes 204 of each of the four connectors 102, to form the bottom plane 502E. The bottom plane 502E has a square configuration with the four rods 104 defining the four sides of the square.

At step 1206, a rod 104 is coupled with each of the four connectors 102 of the bottom plane 502E formed at the step 1204, via the first end 302 of the rod 104. Each of these rods 104 are oriented vertically, i.e., perpendicular to the bottom plane 502E. Further, upon coupling the rod 104 with the associated connector 102, the rod may be fastened with the connector using the fastener(s) 106. Furthermore, at step 1206, the bottom plate assembly 110 including the bottom plate 802 and the bottom sheet 804 may be attached to the four rods 104 forming the bottom plane 502E. The bottom plate 802 may be attached to the four rods 104 forming the bottom plane 502E via the brackets 804A, 804B, 804C, 804D provided at the four plate-edges 802A, 802B, 802C, 802D, respectively of the bottom plate 802.

At step 1208, at least one panel 108 may be attached to the vertically oriented rods 104 and the rods forming the bottom plane 502E. For example, as shown in FIG. 12, four panels 108-1, 108-2, 108-3, 108-4 may be attached to the vertically oriented rods 104 and the rods 104 forming the bottom plane 502E. Here, the panels 108-1, 108-3 along the side planes 502A, 502C may be first type panels 600 and the panels 108-2, 108-4 along the side planes 502B, 502D may be second type panels 700. Each panel 108 includes four panel-edges to be attached to an associated rod of the set of twelve rods 104, via at least one snap-fastener 606, 706, as explained in conjunction with FIGS. 6-7. For the first type panel 600, the bottom panel-edge 602C, the top panel-edge 602D, and the side panel-edges 602A, 602C include two loops 604 each, each loop 604 configured to loop around the associated rod. Each loop 604 includes the top-half 606A of the snap-fastener 606. Further, the first type panel 600 includes the bottom-half 606B of the snap-fastener 606 configured to engage with the top-half 606A of the snap-fastener 606. The top-half 606A and the bottom-half 606B of the snap-fastener 606 are configured to engage with each other to fasten the loop 604 with the first type panel 600 upon the loop 604 looping around the associated rod. For the second type panel 700, the bottom panel-edge 702C and the top panel-edge 702D include two loops 704 each, and the side panel-edges 702A, 702C include one loop 704 each, each loop 704 configured to loop around the associated rod. Each loop 704 includes the top-half 707A of the snap-fastener 707. Further, the second type panel 700 includes the bottom-half 707B of the snap-fastener 707 configured to engage with the top-half 707A of the snap-fastener 707. The top-half 707A and the bottom-half 707B of the snap-fastener 707 are configured to engage with each other to fasten the loop 704 with the second type panel 700 upon the loop 704 looping around the associated rod. Once the connectors 102 and the rods 104 are coupled with each other to form the cuboid structure 500 defining four side planes, at least one of the four panels 108-1, 108-2, 108-3, 108-4 may be fastened to the cuboid structure 500, by attaching each of the four panel-edges of the panel 108 to an associated rod 104 of the four rods defining a side plane.

In particular, panel-edges 602B, 602D of the first type panel 600 may be attached to an associated rod of the vertically oriented rods 104, via the two loops provided on the panel-edges 602B, 602D and at least one snap-fastener (i.e., 606). Further, the panel-edge 602C of the first type panel 600 may be attached to an associated rod of the four rods forming the bottom plane 502E, via the two loops 604 provided on the panel-edge 602C. The snap-fastener 606 and the fastening of the panel with the rod are already explained above. It should be noted that the panel-edge 602A may remain un-attached to any rods at the step 1208. As such, at step 1208, the two loops loop 604 associated with the panel-edges 602B, 602C, 602D may be looped around (i.e., closed) the associated rod 104, while the two loops 604 associated with the panel-edge 602A may be open.

In particular, panel-edges 702B, 702D of the second type panel 700 may be attached to an associated rod of the vertically oriented rods 104, via the one loop provided on the panel-edges 702B, 702D and at least one snap-fastener (i.e., 707). Further, the panel-edge 702C of the second type panel 700 may be attached to an associated rod of the four rods forming the bottom plane 502E, via the two loops 704 provided on the panel-edge 702C. The snap-fastener 707 and the fastening of the panel with the rod are already explained above. It should be noted that the panel-edge 702A may remain un-attached to any rods at the step 1208. As such, at step 1208, the two loops loop 704 associated with the panel-edges 702B, 702C, 702D may be looped around (i.e., closed) the associated rod 104, while the two loops 704 associated with the panel-edge 702A may be open.

At step 1210, four more rods 104 are coupled with the rest of four connectors 102 (of the set of eight connectors), by coupling two rods with two coupling-holes 204 of each of these four connectors 102, to form the top plane 502F, similar to forming the bottom plane 502E at step 1204. The top plane 502F has a square configuration with the four rods 104 defining the four sides of the square.

At step 1212, a connector of the four connectors forming the top plane 502F may be coupled with each of the vertically oriented rods 104 via the second end 304 of the rod. By this configuration, the four rods 104 and the four connectors 102 forming the top plane 502F may be coupled with the four vertically oriented rods 104. Further, at step 1212 the panel-edge 602A of the first type panels 600 and the panel-edge 702A of the second type panels 700 may be attached to the associated rods 104 forming the top plane 502F. As such, at step 1212, the two loops 604 associated with the panel-edge 602A and the at two loops 604 associated with the panel-edge 702A may also be looped around (i.e., closed) the associated rod and fastened using the at least one snap-fastener.

At step 1214, the top plate assembly 114, including the top plate 902 and the top sheet 906 may be attached to the four rods 104 forming the top plane 502F. The top plate 902 may be attached to the four rods 104 forming the top plane 502F via the brackets 904A, 904B, 904C, 904D provided at each of the four plate-edges 902A, 902B, 902C, 902D of the bottom plate 902.

At step 1216, the base 112 may be configured in the second configuration by engaging the first half longitudinal section 1002 with the second half longitudinal section 1004, for example, by engaging the first locking member 1006A with the second locking member 1006B. As such, upon being configured in the second configuration at step 1216, the base 112 may define the elongated structure including the hollow cylindrical portion 112A, the bottom frustrum portion 112B, and the top frustrum portion 112C.

At step 1218, the assembly of the twelve rods 104, the eight connectors 102, the at least one panel 108, the bottom plate assembly 110, and the top plate assembly 114 created till the step 1214 may be positioned on the base 112. In particular, the bottom plate assembly 110 may be positioned on a top surface of the top frustrum portion 112C, to therefore form the animal habitat 1100.

Figure 13:
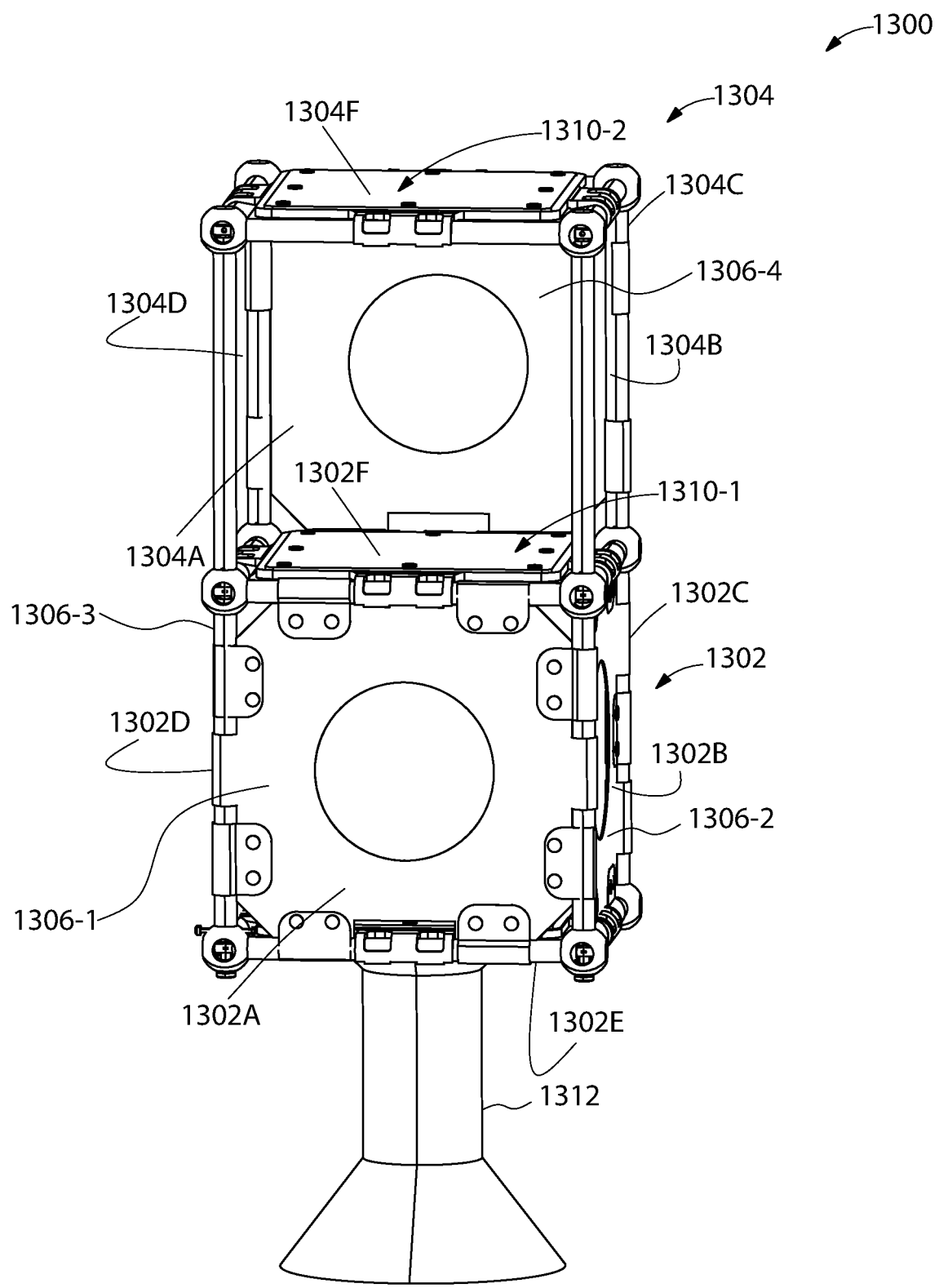
FIG. 13 illustrates a perspective view of an animal habitat, in a second configuration, in accordance with yet another configuration of the present disclosure.

Referring now to FIG. 13, a perspective view of an animal habitat assembly 1300, in a second configuration, is illustrated in accordance with some configurations of the present disclosure. The animal habitat assembly 1300 may be assembled by coupling a set of twenty rods 104 with a set of twelve connectors 102 to form a double-cuboid structure. In other words, the animal habitat assembly 1300 in the second configuration is represented by the double-cuboid structure. The animal habitat assembly 1300 includes a first cuboid structure 1302 (same as cuboid structure 500) defining four side planes 1302A, 1302B, 1302C, 1302D, a bottom plane 1302E, and a top plane 1302F. Each of the four side planes 1302A, 1302B, 1302C, 1302D, the bottom plane 1302E, and the top plane 1302F is defined by four rods of the set of twenty rods 104. The animal habitat assembly 1300 further includes a second cuboid structure 1304 positioned above the first cuboid structure 1302. The second cuboid structure 1304 includes four side planes 1304A, 1304B, 1304C, 1304D, a bottom plane 1304E, and a top plane 1304F. Each of the four side planes 1304A, 1304B, 1304C, 1304D, the bottom plane 1304E, and the top plane 1304F is defined by four rods of the set of twenty rods 104. As will be understood, the top plane 1302F and the bottom plane 1304E are shared by the both the first cuboid structure 1302 and the second cuboid structure 1304 (therefore the top plane 1302F and the bottom plane 1304E are generally coplanar). As will be further understood, each of four connectors 102 forming the top plane 1302F or the bottom plane 1304E is coupled with four rods 104, via the four coupling-holes of the connector 102. Further, each of the remaining eight connectors 102 of the set of twelve connectors is coupled with three rods 104 of the set of twenty rods via the three coupling-holes of the connector 102.

The animal habitat assembly 1300 further includes at least panel 1306, each having four panel-edges. Each of the four panel-edges of the at least one panel is attached to an associated rod of the four rods of the set of twenty rods defining a side plane of the four side planes of the first cuboid structure or the second cuboid structure. For example, as shown in FIG. 13, the animal habitat assembly 1300 includes four panels 1306-1, 1306-2, 1306-3, 1306-4. The panels 1306-1, 1306-2, 1306-3 are attached along the side planes 1302A, 1302B, 1302D, respectively. The panel 1306-4 is attached along the side plane 1304C. It should be noted that the panels 1306-1, 1306-4 are first type panels 600 and the panels 1306-1, 1306-4 are second type panels 700.

The animal habitat assembly 1300 further includes a bottom plate assembly 1308-1 (not shown in FIG. 13, corresponding to the bottom plate assembly 110) positioned on the four rods defining the bottom plane 1302E. The animal habitat assembly 1300 further includes a first top plate assembly 1310-1 (corresponding to the top plate assembly 114) positioned on the four rods defining the top plane 1302F. The animal habitat assembly 1300 further includes a second top plate assembly 1310-2 (corresponding to the top plate assembly 114) positioned on the four rods defining the top plane 1304F.

The animal habitat assembly 1300 may further include a base 1312 (corresponding to the base 112). The first cuboid structure 1302 and the second cuboid structure 1304 is positioned on the base 1312. In particular, the bottom plate assembly 1308-1 is to be positioned over the base 112.

Figure 14:
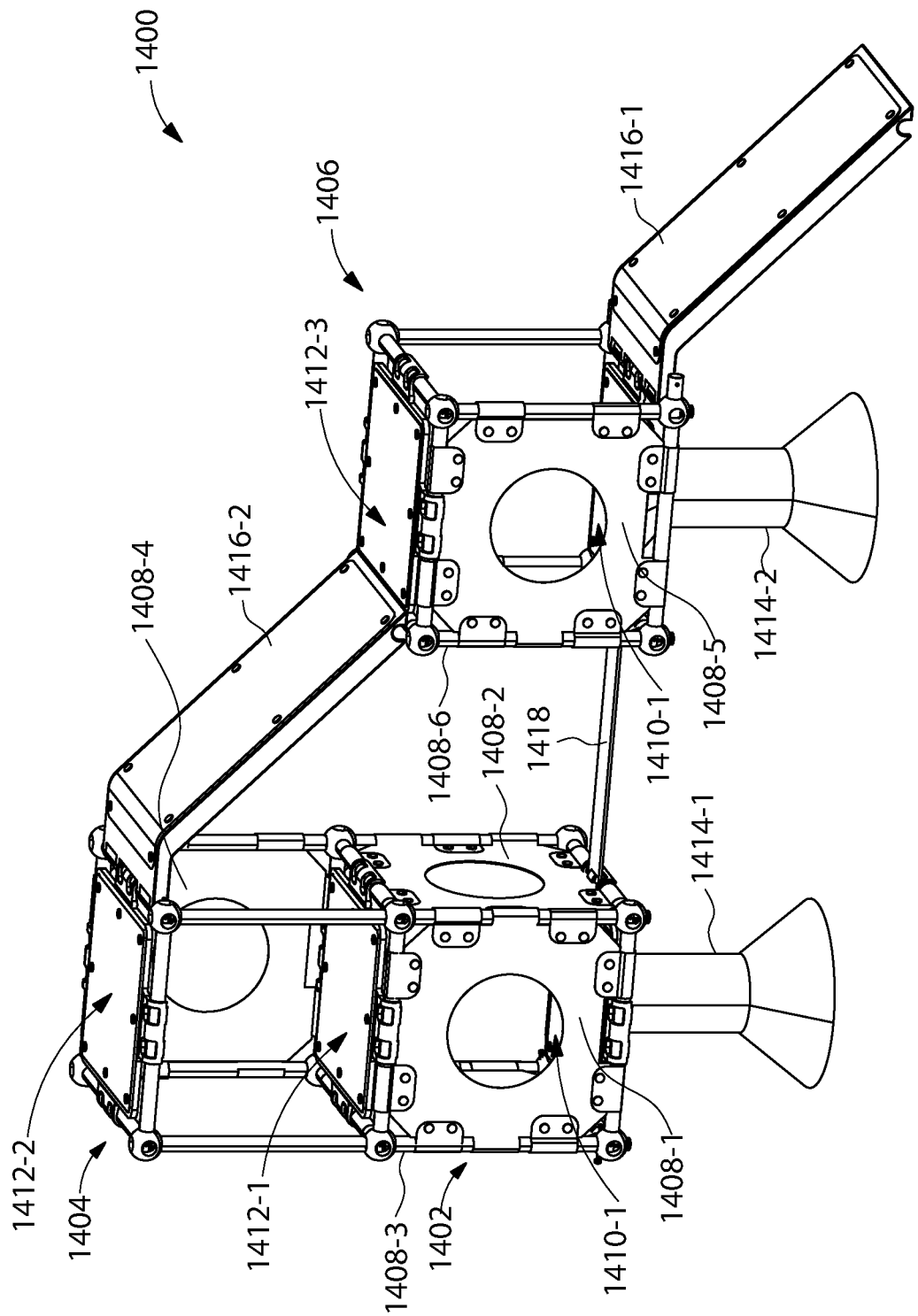
FIG. 14 illustrates a perspective view of an animal habitat, in a second configuration, in accordance with another configuration of the present disclosure.

Referring now to FIG. 14, a perspective view of an animal habitat assembly 1400, in a second configuration, is illustrated in accordance with some configurations of the present disclosure. The animal habitat assembly 1400 may be assembled by coupling a set of thirty-two rods 104 with a set of twenty connectors 102. The animal habitat assembly 1400 includes a first cuboid structure 1402 (same as the cuboid structure 500 and the cuboid structure 1302) defining four side planes 1402A, 1402B, 1402C, 1402D, a bottom plane 1402E, and a top plane 1402F (planes 1402A, 1402B, 1402C, 1402D, 1402E, 1402F are not shown in FIG. 14; these planes are corresponding to planes 502A, 502B, 502C, 502D, 502E, 502F of the cuboid structure 500). Each of the four side planes 1402A, 1402B, 1402C, 1402D, the bottom plane 1402E, and the top plane 1402F is defined by four rods of the set of thirty-two rods 104.

The animal habitat assembly 1400 further includes a second cuboid structure 1404 (same as cuboid structure 1304) positioned above the first cuboid structure 1402. The second cuboid structure 1404 includes four side planes 1404A, 1404B, 1404C, 1404D, a bottom plane 1404E, and a top plane 1404F (planes 1404A, 1404B, 1404C, 1404D, 1404E, 1404F are not shown in FIG. 14; these planes are corresponding to planes 502A, 502B, 502C, 502D, 502E, 502F of the cuboid structure 500). Each of the four side planes 1404A, 1404B, 1404C, 1404D, the bottom plane 1404E, and the top plane 1404F is defined by four rods of the set of thirty-two rods 104. As will be understood, the top plane 1402F and the bottom plane 1404E are shared by both the first cuboid structure 1402 and the second cuboid structure 1404 (therefore, the top plane 1402F and the bottom plane 1404E are generally coplanar).

The animal habitat assembly 1400 further includes a third cuboid structure 1406 (same as the cuboid structure 500, the cuboid structure 1302, and the cuboid structure 1402) defining four side planes 1406A, 1406B, 1406C, 1406D, a bottom plane 1406E, and a top plane 1406F (planes 1406A, 1406B, 1406C, 1406D, 1406E, 1406F are not shown in FIG. 14; these planes are corresponding to planes 502A, 502B, 502C, 502D, 502E, 502F of the cuboid structure 500). Each of the four side planes 1406A, 1406B, 1406C, 1406D, the bottom plane 1406E, and the top plane 1406F is defined by four rods of the set of thirty-two rods 104.

The animal habitat assembly 1400 further includes at least one panel 1408, each having four panel-edges. Each of the four panel-edges of the at least one panel is attached to an associated rod of the four rods of the set of twenty rods defining a side plane of the four side planes of the first cuboid structure or the second cuboid structure. For example, as shown in FIG. 14, the animal habitat assembly 1400 includes six panels 1408-1, 1408-2, 1408-3, 1408-4, 1408-5, 1408-6. The panels 1408-1, 1408-2, 1408-3 are attached along the side planes 1402A, 1402B, 1402D, respectively. The panel 1408-4 is attached along the side plane 1404C. The panels 1408-5, 1408-6 are attached along the side planes 1406A, 1406D, respectively. It should be noted that the panels 1408-1, 1408-4, 1408-5 are first type panels 600 and the panels 1408-2, 1408-3, 1408-6 are second type panels 700.

The animal habitat assembly 1400 further includes a first bottom plate assembly 1410-1 (corresponding to the bottom plate assembly 110) positioned on the four rods defining the bottom plane 1402E. The animal habitat assembly 1400 further includes a second bottom plate assembly 1410-2 (corresponding to the bottom plate assembly 110) positioned on the four rods defining the bottom plane 1406E. The animal habitat assembly 1400 further includes a first top plate assembly 1412-1 (corresponding to the top plate assembly 114) positioned on the four rods defining the top plane 1402F. The animal habitat assembly 1400 further includes a second top plate assembly 1412-2 (corresponding to the top plate assembly 114) positioned on the four rods defining the top plane 1404F. The animal habitat assembly 1400 further includes a third top plate assembly 1412-3 (corresponding to the top plate assembly 114) positioned on the four rods defining the top plane 1406F.

The animal habitat assembly 1400 may further include a first base 1414-1 and a second base 1414-2 (corresponding to the base 112). The first cuboid structure 1402 and the second cuboid structure 1404 is positioned on the first base 1414-1. In particular, the first bottom plate assembly 1410-1 is positioned over the first base 1414-1. The second bottom plate assembly 1410-2 is positioned over the second base 1414-2.

The animal habitat assembly 1400 may further include at least one ramp 1416. In some configurations, each the at least one ramp 1416 may be configured to mount on one of the four rods defining the bottom plane of the cuboid structure. Alternatively, each the at least one ramp 1416 may be configured to mount on one of the four rods defining the top plane of the cuboid structure. The ramp 1416 may provide a path for the animal to climb up or climb down across different vertical levels on the animal habitat assembly 1400. The ramp 1416 is further explained in detail in conjunction with FIG. 15.

Figure 15:
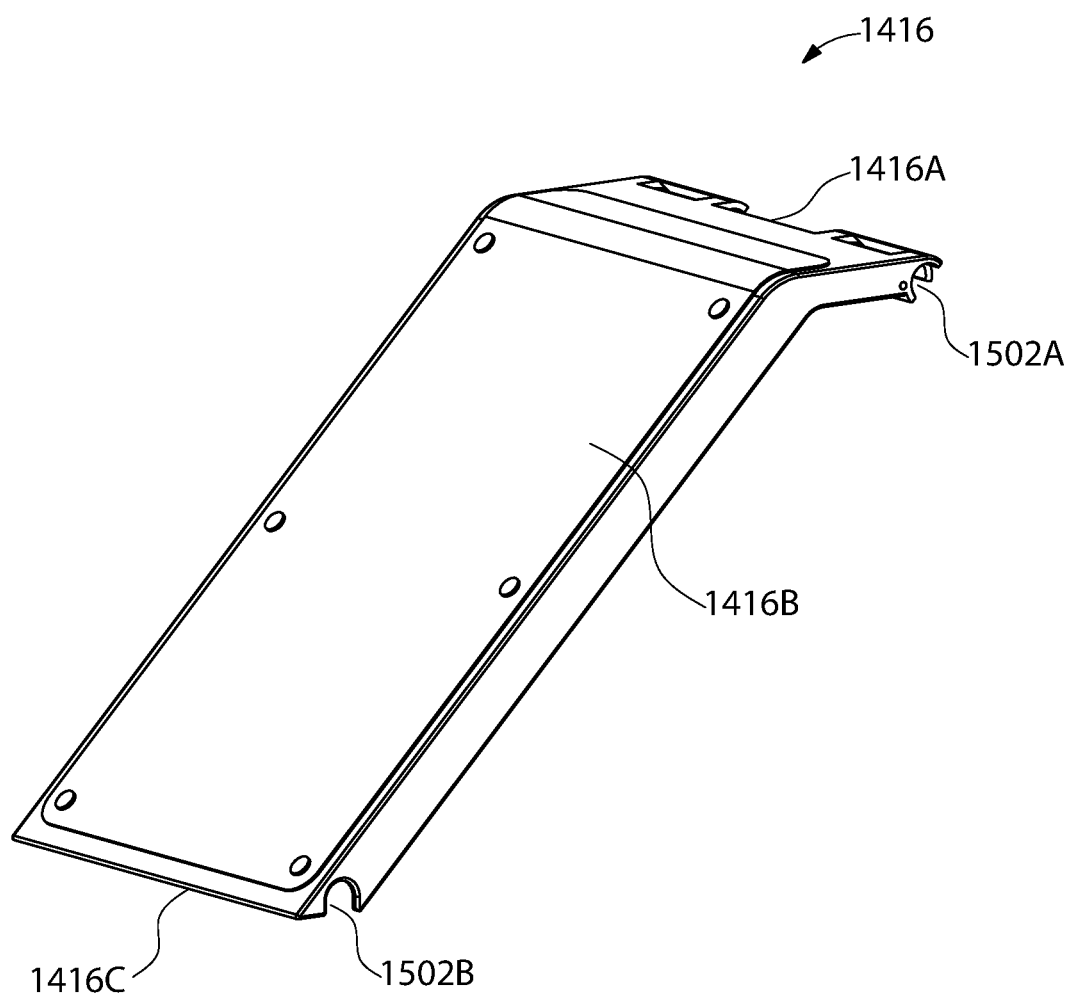
FIG. 15 illustrates a perspective view of a ramp, in accordance with some configurations of the present disclosure.

Referring now to FIG. 15, a perspective view of the ramp 1416 is illustrated in accordance with some configurations of the present disclosure. The ramp 1416 may include a top edge 1416A, a bottom edge 1416B, and a slant surface 1416C defined between the top edge 1416A and the bottom edge 1416B. The ramp 1416 may further include a pair of claws 1502A provided on the top edge 1416A (only one claw of the pair of claws 1502A is shown in FIG. 15). Alternatively or additionally, the ramp 1416 may include a pair of claws 1502B on the bottom edge 1416B (only one claw of the pair of claws 1502B is shown in FIG. 15). The claws 1502A, 1502B may allow the ramp 1416 to be easily mounted on one of the four rods defining the bottom plane or on one of the four rods defining the top plane of one of the cuboid structures 1402, 1404, 1406. The claws 1502A, 1502B may be formed into the structure of the ramp 1416. Further, the size and shape of the claws 1502A, 1502B may be in conformity with the size and shape of the rod(s) on which the ramp 1416 is to be mounted.

Referring back to FIG. 14, for example, the animal habitat assembly 1400 includes two ramps 1416-1, 1416-2. Further, the ramp 1416-1 is mounted on one of the four rods defining the bottom plane 1406E of the cuboid structure 1406, via the pair of claws 1502B provided on the bottom edge 1416B of the ramp 1416-1.

The ramp 1416-2 is mounted on one of the four rods defining the top plane 1404F of the cuboid structure 1404 via the pair of claws 1502A provided on the top edge 1416A of the ramp 1416-1. The ramp 1416-2 is further mounted on the top plane 1406F of the cuboid structure 1406 via the pair of claws 1502B provided on the bottom edge 1416B of the ramp 1416-2.

The animal habitat assembly 1400 may further include a connecting shaft 1418 connecting the first bottom plate assembly 1410-1 and the second bottom plate assembly 1410-2. The connecting shaft 1418 may be configured to be mounted on one of the four rods forming the bottom plane 1402E or the bottom plane 1406E. For example, the connecting shaft 1418 may include an engaging member provided on each of its two ends. The connecting shaft 1418 may be mounted on one of the four rods forming the bottom plane 1402E and the bottom plane 1406E via the engaging members provided on the two ends of the connecting shaft 1418.

Figure 16:
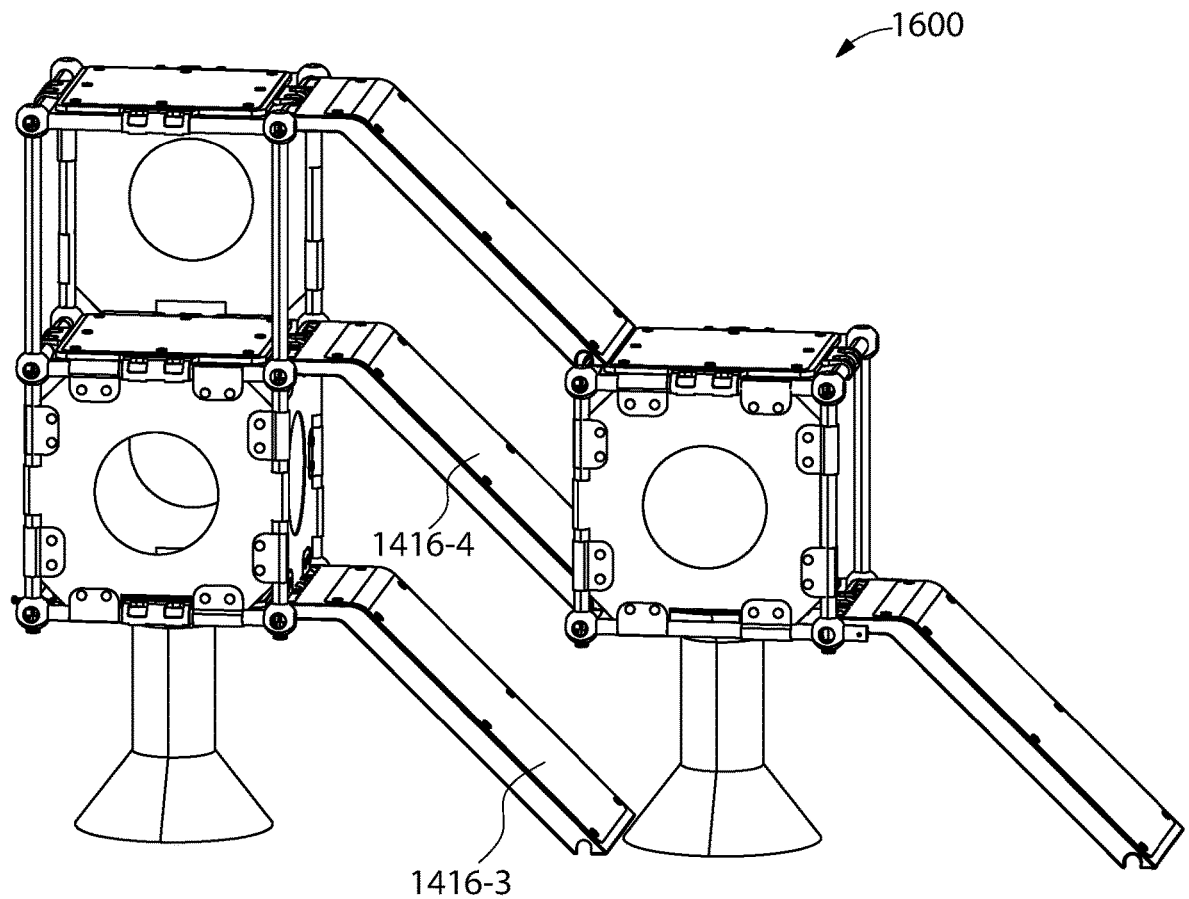
FIG. 16 illustrates a perspective view of an animal habitat, in a second configuration, in accordance with yet another configuration of the present disclosure.
Figure 17:
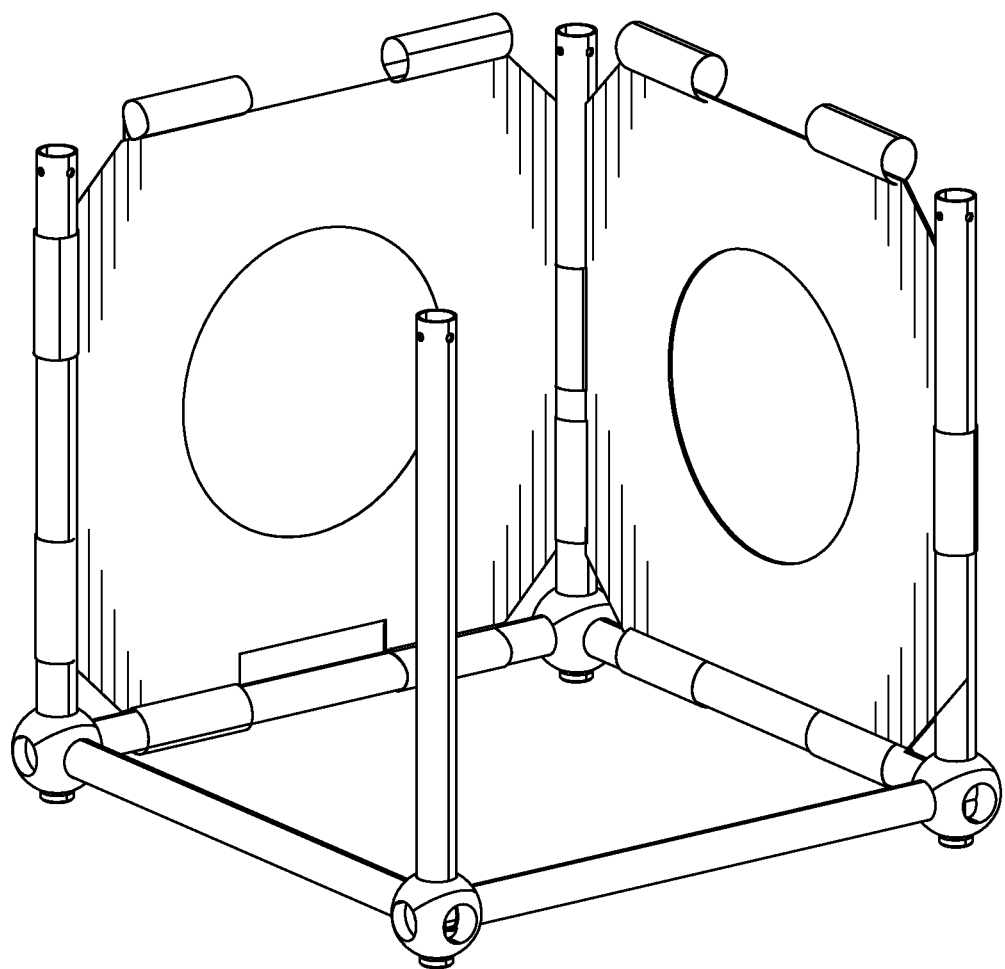
FIGS. 17-23 illustrate different views (i.e., a left side view, a right side view, a front view, a rear view, a top view, and a bottom view, respectively) of a cuboid structure including four connectors, eight rods, and two panels (corresponding to the animal habitat assembly of FIG. 1), in accordance with a configuration with extraneous details (in other words, it is understood that in further filings and prosecution, various limiting details may be removed leaving a broader configuration)
Figure 18:
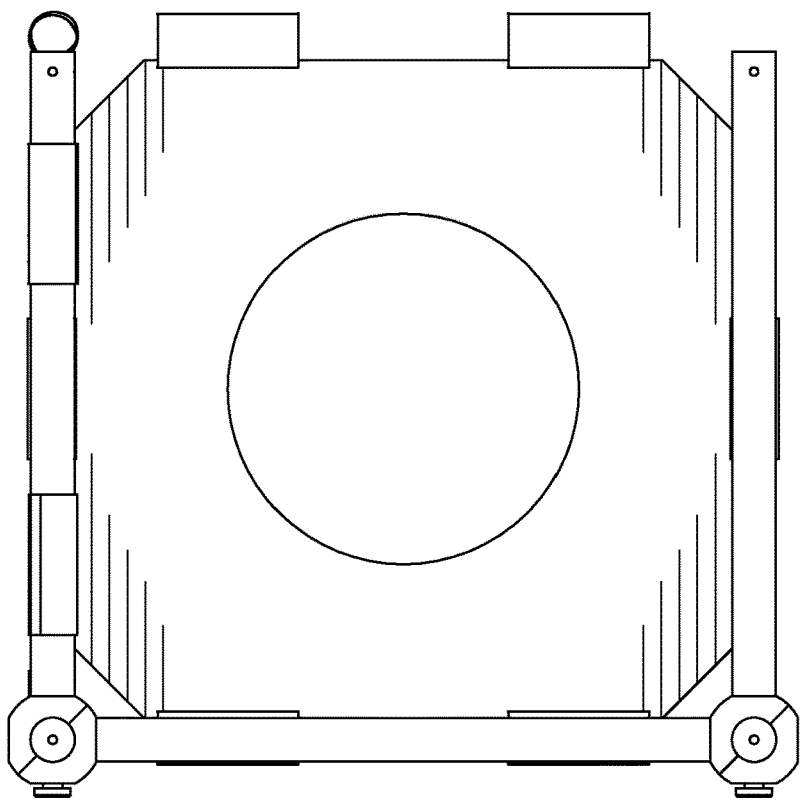
Figure 19:
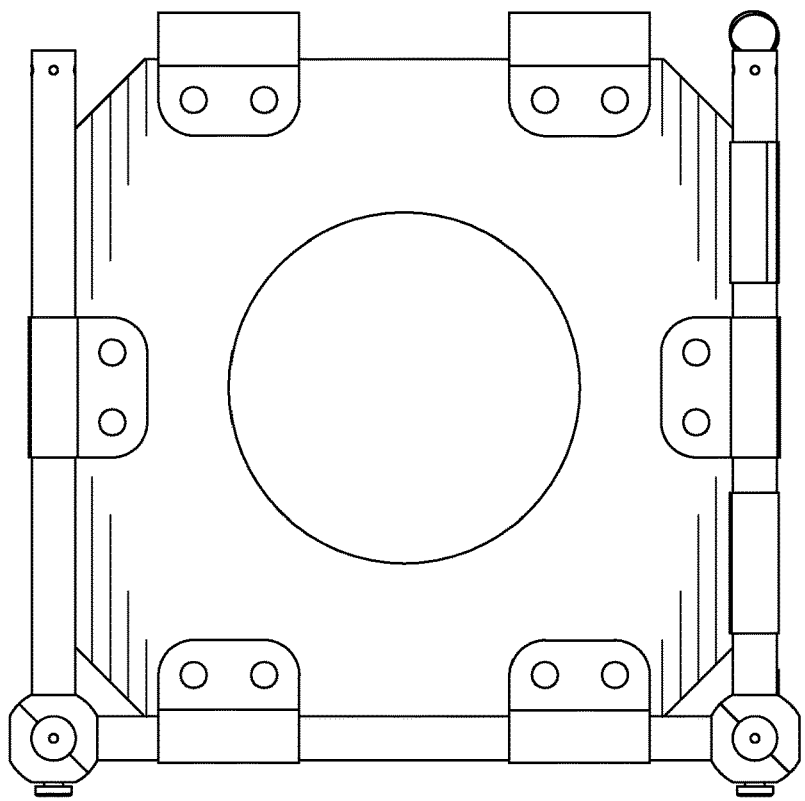
Figure 20:
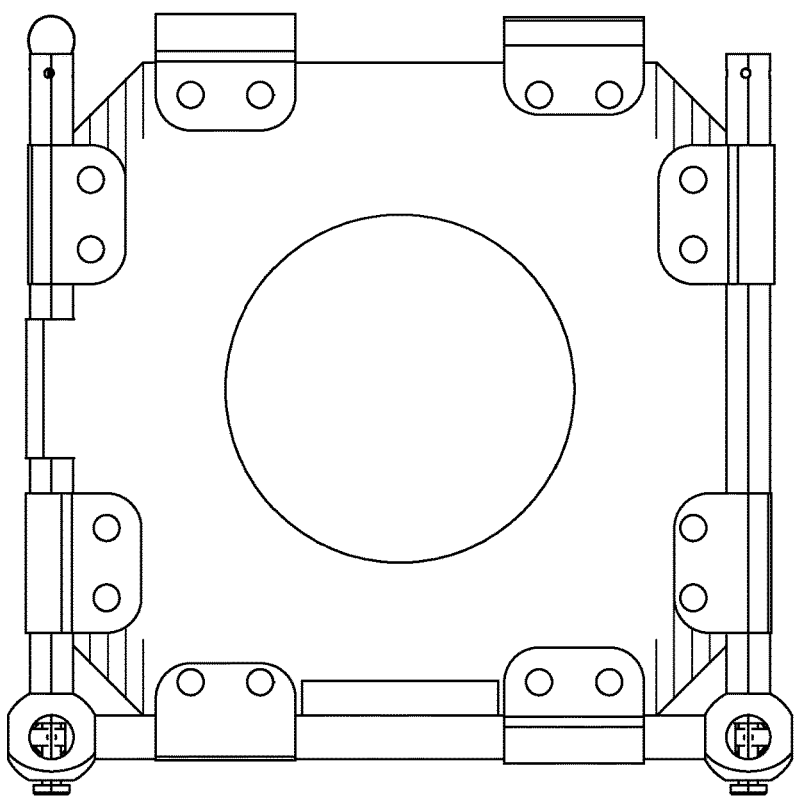
Figure 21:
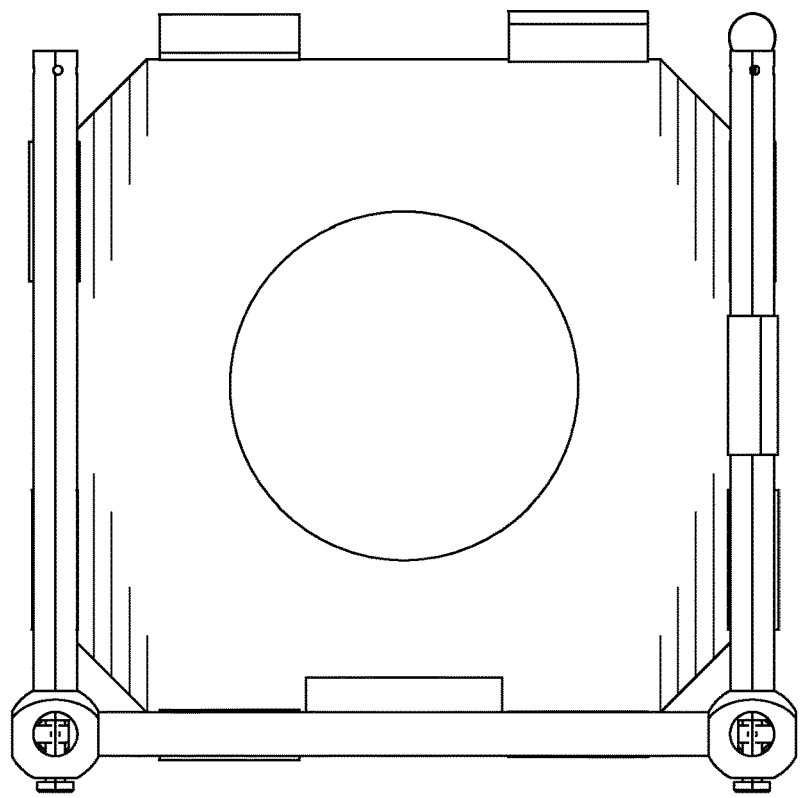
Figure 22:
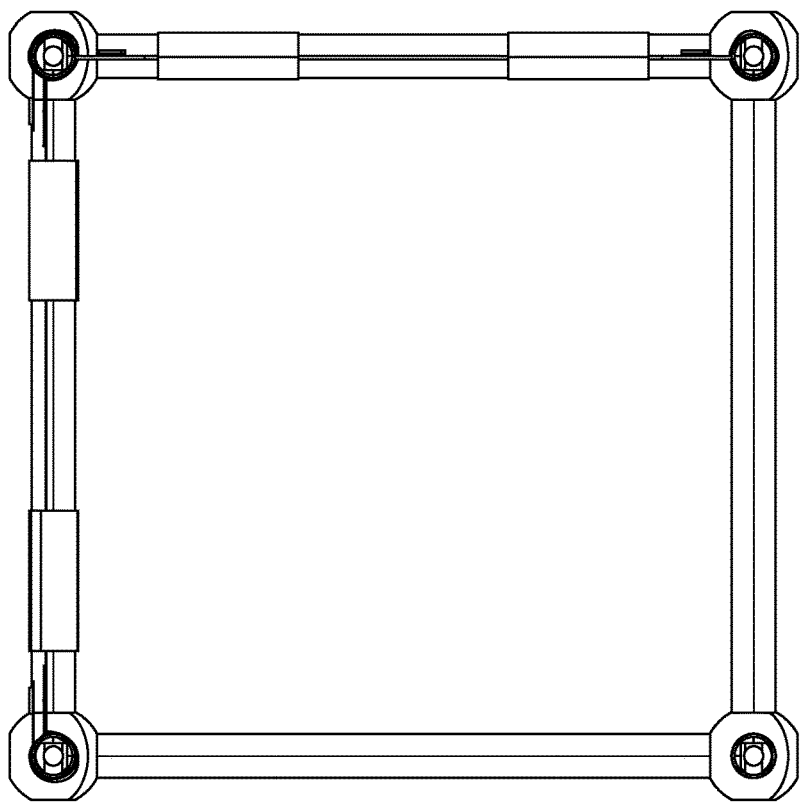
Figure 23:
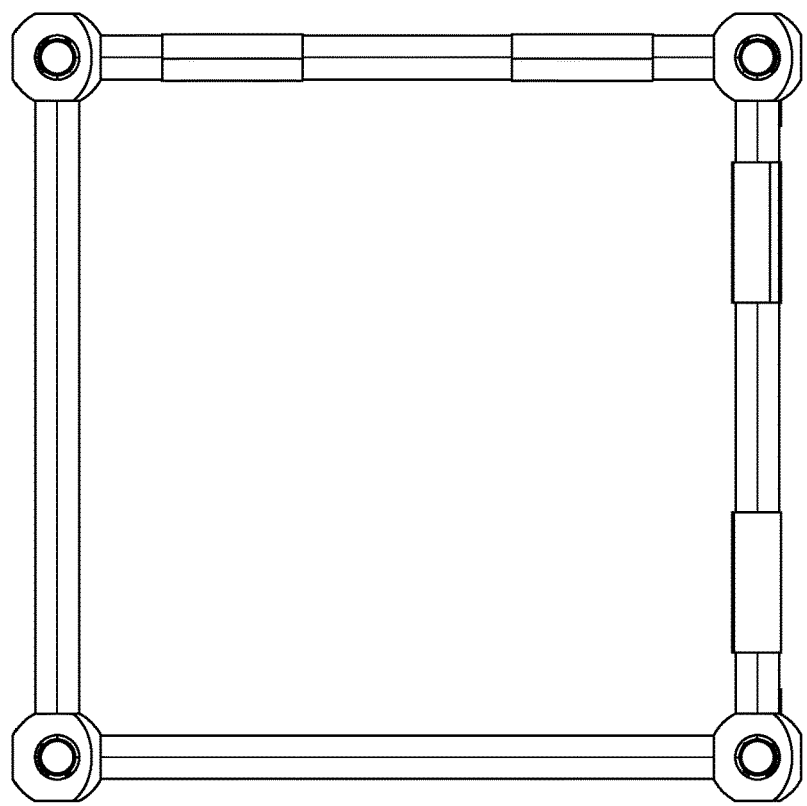
Figure 24:
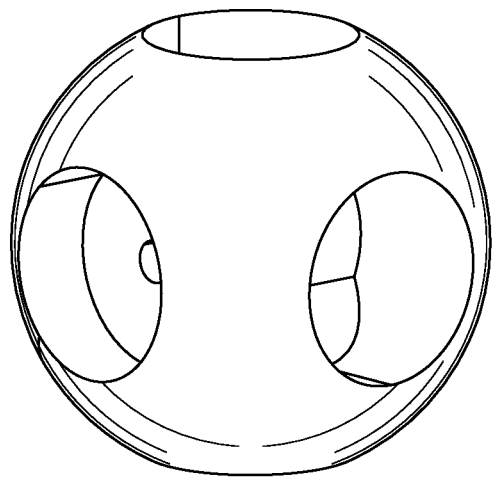
FIGS. 24-30 illustrate different views (i.e., a left side view, a right side view, a front view, a rear view, a top view, and a bottom view, respectively) of a connector (corresponding to the animal habitat assembly of FIG. 1), in accordance with a configuration with extraneous details (in other words, it is understood that in further filings and prosecution, various limiting details may be removed leaving a broader configuration)
Figure 25:
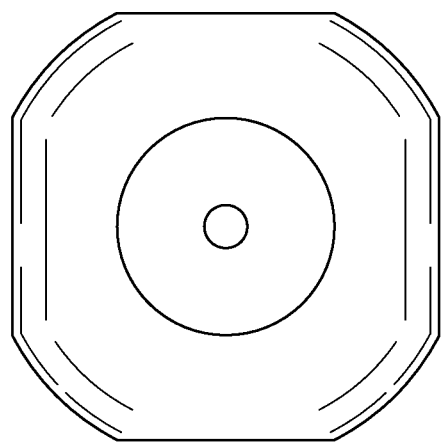
Figure 26:
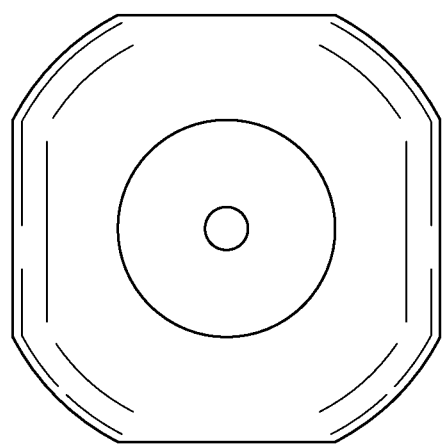
Figure 27:
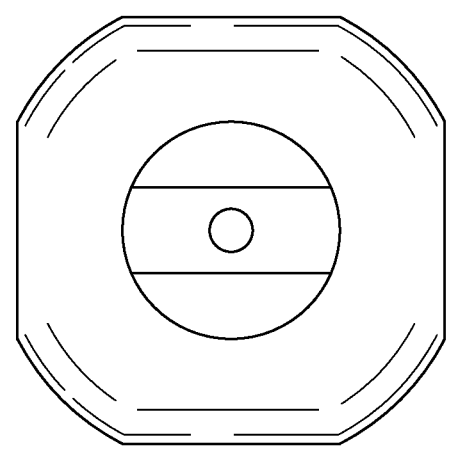
Figure 28:
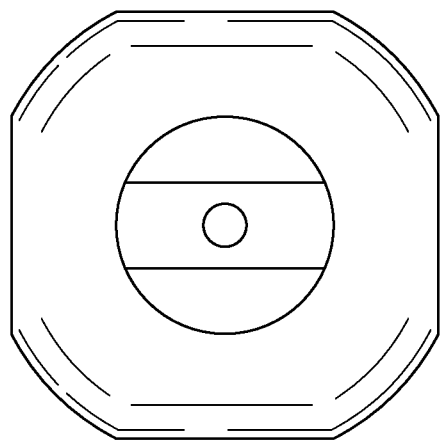
Figure 29:
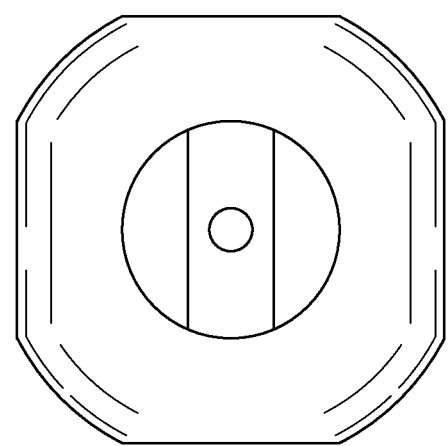
Figure 30:
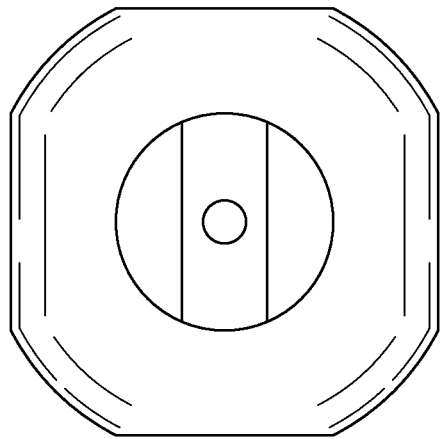
Figure 31:
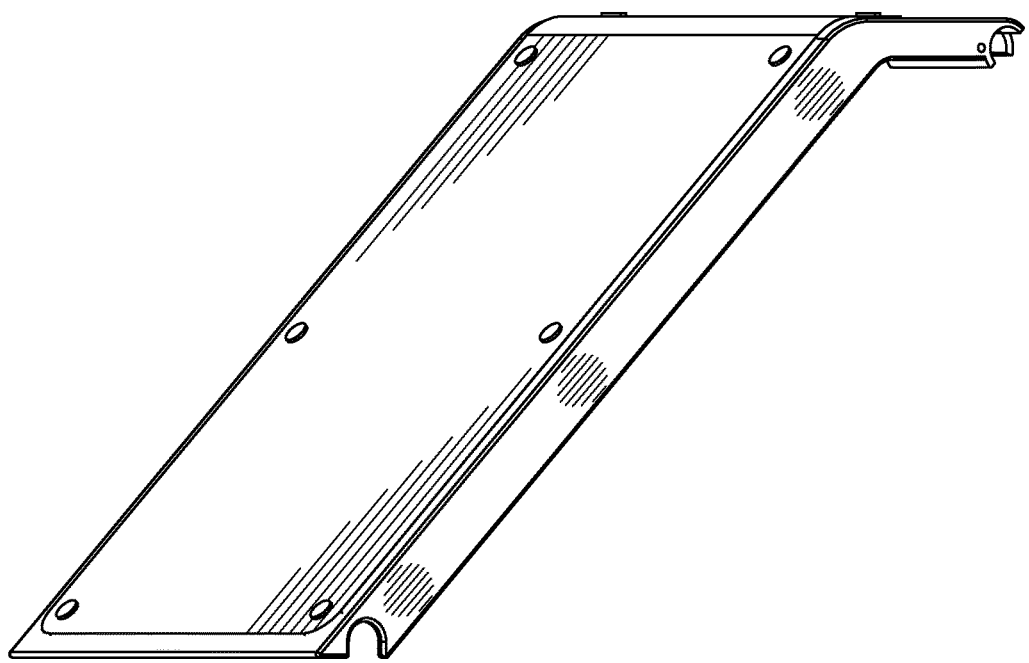
FIGS. 31-37 illustrate different views (i.e., a left side view, a right side view, a front view, a rear view, a top view, and a bottom view, respectively) of a ramp (corresponding to the animal habitat assembly of FIG. 1), in accordance with a configuration with extraneous details (in other words, it is understood that in further filings and prosecution, various limiting details may be removed leaving a broader configuration).
Figure 32:
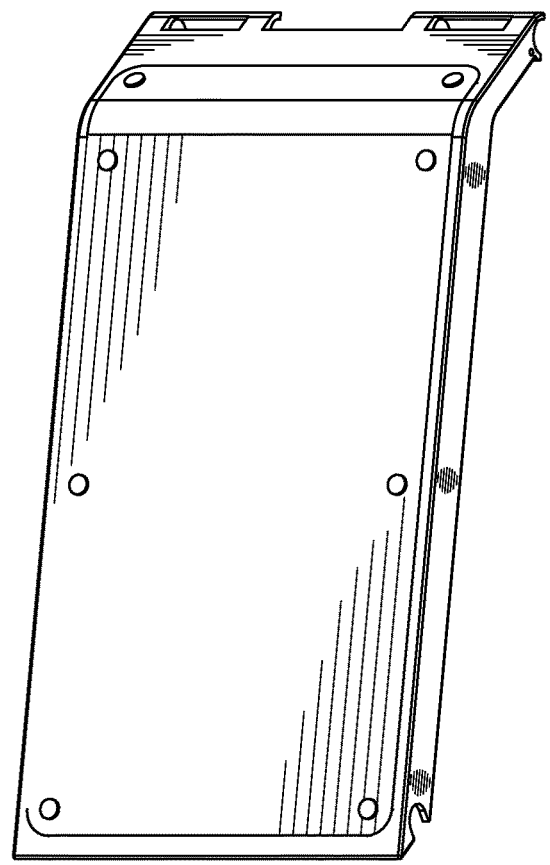
Figure 33:
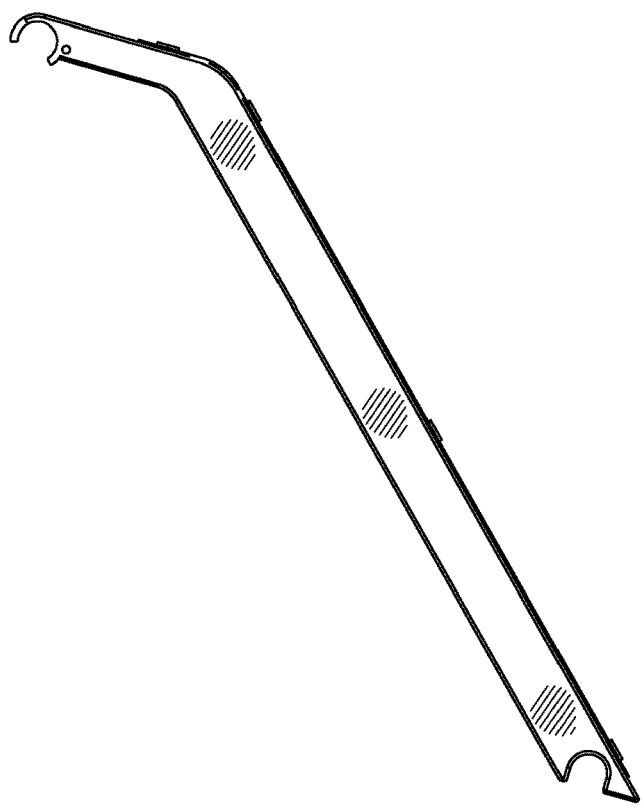
Figure 34:
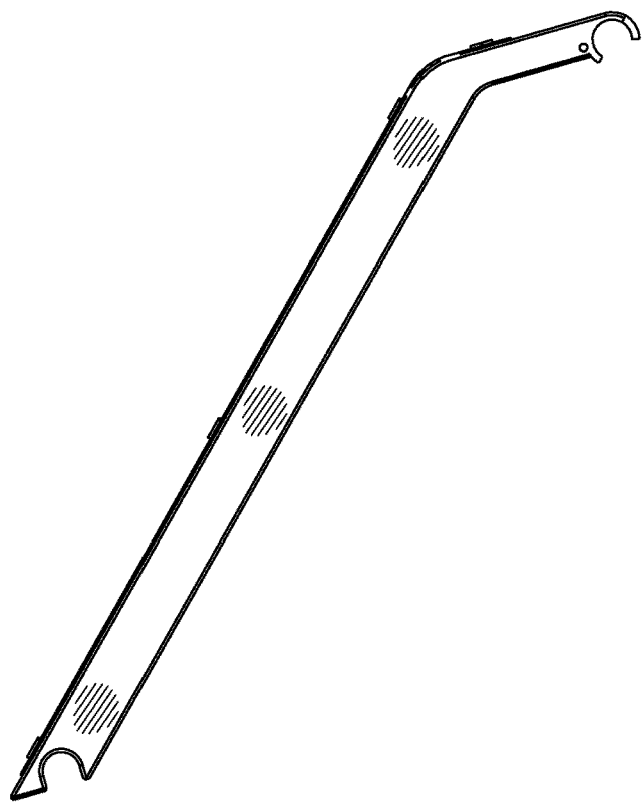
Figure 35:
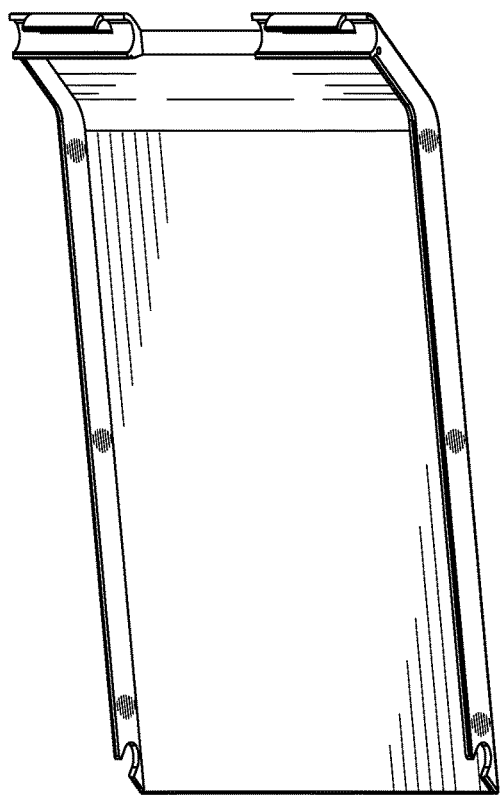
Figure 36:
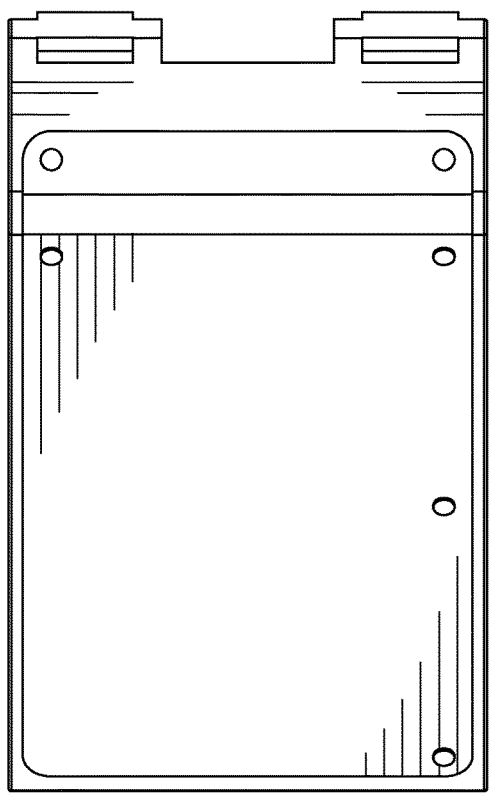
Figure 37:
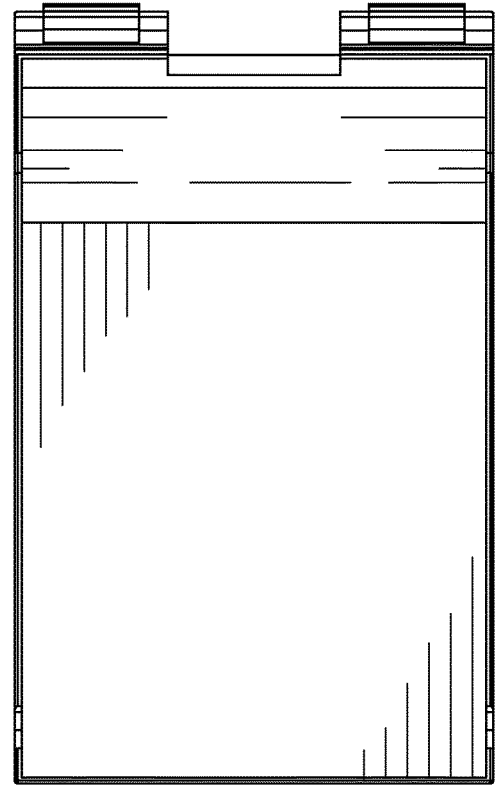

Referring now to FIG. 16, a perspective view of an animal habitat assembly 1600, in a second configuration, is illustrated in accordance with some configurations of the present disclosure. The animal habitat assembly 1600 is a modification of the animal habitat assembly 1400, with the animal habitat assembly 1600 including the first cuboid structure 1402, the second cuboid structure 1404, the third cuboid structure 1406, the six panels 1408-1, 1408-2, 1408-3, 1408-4, 1408-5, 1408-6, the first bottom plate assembly 1410-1, the second bottom plate assembly 1410-2, the first top plate assembly 1412-1, the second top plate assembly 1412-2, the third top plate assembly 1412-3, the first base 1414-1, the second base 1414-2, and the two ramps 1416-1, 1416-2 (the above are shown in FIG. 14, and not shown in FIG. 16 to avoid repetition).

Referring now to FIG. 17-23, showing views of a cuboid structure including four connectors, eight rods, and two panels. As previously mentioned (in the Brief Description of the Drawings), the illustrated configuration may have extraneous details. It is understood that in further filings and prosecution, various limiting details may be removed, resulting in a broader configuration. For example, provided for illustrative purposes only, a cuboid configuration may delete the opening 608 (FIG. 6B) or delete some or all details of the cuboid.

Referring now to FIG. 24-30, showing views of a connector. As previously mentioned (in the Brief Description of the Drawings), the illustrated configuration may have extraneous details. It is understood that in further filings and prosecution, various limiting details may be removed, resulting in a broader configuration. For example, provided for illustrative purposes only, a connector configuration may delete some of the holes.

Referring now to FIG. 31-37, showing views of a ramp. As previously mentioned (in the Brief Description of the Drawings), the illustrated configuration may have extraneous details. It is understood that in further filings and prosecution, various limiting details may be removed, resulting in a broader configuration. For example, provided for illustrative purposes only, may delete the claws 1502B (FIG. 15) or delete some or all details of the cuboid The animal habitat assembly 1600 further includes a third ramp 1416-3 and a fourth ramp 1416-4. The third ramp 1416-3 is mounted on one of the four rods defining the bottom plane 1402E of the cuboid structure 1402, via the pair of claws 1502A provided on the top edge 1416A of the ramp 1416-3. The fourth ramp 1416-4 is mounted on one of the four rods defining the top plane 1402F of the cuboid structure 1402, via the pair of claws 1502A provided on the top edge 1416A of the ramp 1416-4. Alongside, the fourth ramp 1416-4 is mounted on one of the four rods defining the top plane 1406F of the cuboid structure 1406, via the pair of claws 1502B provided on the bottom edge 1416B of the ramp 1416-4.

In one alternative, the animal habitat assembly (e.g. animal habitat 1100, FIG. 11) includes panels (e.g. panel 108-1, 108-2, 108-3) that are readily removable to enable cleaning/washing. In this regard, the panels are removed from the cuboid and placed in a cleaning solution. When one or more panels is removed from the cuboid structure, this may be referred to herein as a wash condition/configuration. For example, the cleaning solution may be water with an amount of detergent dissolved therein. This cleaning process removes any dirt, hair, dander, etc. from the panel. After a drying process, the panel is returned to the cuboid and fastened (e.g. with one or more fasteners such as hook-and-loop, magnets, snaps, buttons, zip-closure, clips, catches, hooks, or any similar structure).

In another alternative, the animal habitat assembly may include an attachment point provided for interfacing accessories to the panel. For example, an accessory may be configured as a ball of yarn and the attachment point may be configured as a button. In this illustrative example, the button is attached to a panel while the ball of yarn is separable, but removably attachable, to the panel via the attachment point. Other examples of attachment points include, but are not limited to: snaps, magnets, holes, posts, pins, hook-and-loop, slots, threaded fasteners, temporary adhesive, permanent adhesive, wash-renewing adhesive, etc. Other examples of accessories include, but are not limited to: a bundle of feathers, a fabric mouse, a battery-powered toy, a food-dispensing toy, etc.

It is intended that the disclosure and examples be considered as illustrative only, with a true scope and spirit of disclosed configurations being indicated by the following claims and amendments made thereto in the original application, divisional applications, continuations application, and/or foreign applications.

Various Notes and Examples

Example 1. An animal habitat assembly comprising: a plurality of connectors, each of the plurality of connectors comprising: a body; and at least three coupling-holes formed in the body, each of the three coupling-holes oriented transverse to each other; a plurality of rods, each of the plurality of rods comprising: a first end; and a second end; wherein the first end of a rod of the plurality of rods is configured to fit into one of the at least three coupling-holes of a first associated connector of the plurality of connectors, to couple the rod with the first associated connector; wherein the second end of the rod is configured to fit into one of the at least three coupling-holes of a second associated connector of the plurality of connectors, to couple the rod with the second associated connector; at least one panel comprising four panel-edges; wherein each of the four panel-edges of the at least one panel is configured to attach to an associated rod of the plurality of rods; wherein the animal habitat assembly is configurable between a first configuration and a second configuration; wherein in the first configuration, each of the plurality of rods is decoupled from each of the first associated connector and the second associated connector; and each of the four panel-edges of the at least one panel is detached from an associated rod; and wherein in the second configuration, a set of twelve rods of the plurality of rods are coupled with a set of eight connectors of the plurality of connectors to form a cuboid structure defining four side planes, a bottom plane, and a top plane; each of the four side planes is defined by four rods of the set of twelve rods; each of the four panel-edges of the at least one panel is attached to an associated rod of the four rods of the set of twelve rods defining a side plane of the four side planes; and each connector of the set of eight connectors is coupled with at least three rods of the set of twelve rods, via the three coupling-holes.

Example 2. An animal habitat assembly comprising: a plurality of connectors, each of the plurality of connectors comprising: a body; a first pair of coupling-holes formed in the body and defined opposite to each other; a second pair of coupling-holes formed in the body and defined opposite to each other; and a third pair of coupling-holes formed in the body and defined opposite to each other; wherein the first pair, the second pair, and the third pair of the coupling-holes are oriented along x-axis, y-axis, and z-axis, respectively; a plurality of rods, each of the plurality of rods comprising: a first end; and a second end; wherein the first end of a rod of the plurality of rods is configured to fit into one coupling-hole of the first pair, the second pair, and the third pair of the coupling-holes of a first associated connector of the plurality of connectors, to couple the rod with the first associated connector; wherein the second end of the rod is configured to fit into one coupling-hole of the first pair, the second pair, and the third pair of the coupling-holes of a second associated connector of the plurality of connectors, to couple the rod with the second associated connector; at least one panel comprising four panel-edges; wherein each of the four panel-edges of the at least one panel is configured to attach to an associated rod of the plurality of rods; wherein the animal habitat assembly is configurable between a first configuration and a second configuration; wherein in the first configuration, each of the plurality of rods is decoupled from each of the first associated connector and the second associated connector; and each of the four panel-edges of the at least one panel is detached from an associated rod; and wherein in the second configuration, a set of rods of the plurality of rods are coupled with a set of connectors of the plurality of connectors to form at least one cuboid structure defining at least four side planes, at least one bottom plane, and at least one top plane.

Example 3. A method of assembling an animal habitat, the method comprising: providing a plurality of connectors, each of the plurality of connectors comprising: a body; and at least three coupling-holes formed in the body; wherein the at least three coupling-holes are oriented transverse to each other; providing a plurality of rods, each of the plurality of rods comprising: a first end; and a second end; wherein the first end of a rod of the plurality of rods is configured to fit into one of the at least three coupling-holes of a first associated connector of the plurality of connectors, to couple the rod with the first associated connector; wherein the second end of the rod is configured to fit into one of the at least three coupling-holes of a second associated connector of the plurality of connectors, to couple the rod with the second associated connector; coupling the plurality of connectors with the plurality of rods to form at least one cuboid structure defining: at least four side planes, each defined by four rods; at least one bottom plane, each defined by four rods; and at least one top plane, each defined by four rods; and attaching a panel along one of the at least four side planes, the at least one bottom plane, and the at least one top plane; wherein the panel comprises: four panel-edges; and at least one loop provided at each of the four panel-edges; and wherein attaching the panel comprises: looping the at least one loop about a rod of the four rods defining one of the at least four side planes, the at least one bottom plane, and the at least one top plane; and upon looping, fastening the loop with the panel using at least one fastener.

Example 4. A method of assembling an animal habitat, the method comprising: providing a plurality of connectors, each of the plurality of connectors comprising: a body; and at least three coupling-holes formed in the body; wherein the at least three coupling-holes are oriented transverse to each other; providing a plurality of rods, each of the plurality of rods comprising: a first end; and a second end; wherein the first end of a rod of the plurality of rods is configured to fit into one of the at least three coupling-holes of a first associated connector of the plurality of connectors, to couple the rod with the first associated connector; wherein the second end of the rod is configured to fit into one of the at least three coupling-holes of a second associated connector of the plurality of connectors, to couple the rod with the second associated connector; coupling the plurality of connectors with the plurality of rods to form at least one cuboid structure defining: at least four side planes, each defined by four rods; at least one bottom plane, each defined by four rods; and at least one top plane, each defined by four rods; and attaching a panel along one of the at least four side planes, the at least one bottom plane, and the at least one top plane; wherein the panel comprises: four panel-edges; and at least one loop provided at each of the four panel-edges; and wherein attaching the panel comprises: looping the at least one loop about a rod of the four rods defining one of the at least four side planes, the at least one bottom plane, and the at least one top plane; upon looping, fastening the loop with the panel using at least one fastener; providing at least one ramp, the at least one ramp comprising: a top edge; at least one claw provided on the top edge; a bottom edge; at least one claw provided on the bottom edge; and a slant surface defined between the top edge and the bottom edge; and mounting the at least one ramp on one of the four rods defining the at least one bottom plane or on one of the four rods defining the at least one top plane of the at least one cuboid structure, via at least one of: the at least one claw provided on the top edge; and the at least one claw provided on the bottom edge.

Example 5. An animal habitat assembly comprising: a plurality of connectors, each of the plurality of connectors comprising: a body; and at least three coupling-holes formed in the body; wherein the at least three coupling-holes are oriented transverse to each other; a plurality of rods, each of the plurality of rods comprising: a first end; and a second end; wherein the first end of a rod of the plurality of rods is configured to fit into one of the at least three coupling-holes of a first associated connector of the plurality of connectors, to couple the rod with the first associated connector; wherein the second end of the rod is configured to fit into one of the at least three coupling-holes of a second associated connector of the plurality of connectors, to couple the rod with the second associated connector; at least one panel comprising four panel-edges; wherein each of the four panel-edges of the at least one panel is configured to attach to an associated rod of the plurality of rods; wherein the animal habitat assembly is configurable between a first configuration and a second configuration; wherein in the first configuration, each of the plurality of rods is decoupled from each of the first associated connector and the second associated connector; and each of the four panel-edges of the at least one panel is detached from an associated rod; and wherein in the second configuration, the plurality of rods are coupled with the plurality of connectors to form a prismatic structure defining at least three side planes, a bottom plane, and a top plane; each of the at least three side planes is defined by four rods of the plurality of rods; and each of the four panel-edges of the at least one panel is attached to an associated rod of the four rods defining a side plane of the at least three side planes.

Example 6. The animal habitat assembly of Example 5 further comprising: a bottom plate comprising at least three plate-edges; wherein the bottom plate is configured to be attached to at least three rods defining the bottom plane of the prismatic structure.

Example 7. The animal habitat assembly of Example 6, wherein the bottom plate comprises at least one bracket provided at each of the at least three plate-edges; wherein each of the at least one bracket is configured to engage with a rod of the at least three rods defining the bottom plane, to attach the bottom plate to the at least three rods.

Example 8. The animal habitat assembly of Example 5 further comprising: a top plate comprising at least three plate-edges; wherein the top plate is configured to be attached to at least three rods defining the top plane of the prismatic structure; wherein the top plate comprises: at least one bracket provided at each of the at least three plate-edges; wherein each of the at least one bracket is configured to engage with a rod of the at least three rods defining the top plane, to attach the top plate to the at least three rods defining the top plane.

Example 9. The animal habitat assembly of Example 5, wherein the prismatic structure defines four side planes, a bottom plane, and a top plane; and wherein each of bottom plane and the top plane is defined by four rods of the plurality of rods.

Example 10. An animal habitat assembly comprising: a plurality of connectors, each of the plurality of connectors comprising: a body; and at least three coupling-holes formed in the body, each of the three coupling-holes oriented transverse to each other; a plurality of rods, each of the plurality of rods comprising: a first end; and a second end; wherein the first end of a rod of the plurality of rods is configured to fit into one of the at least three coupling-holes of a first associated connector of the plurality of connectors, to couple the rod with the first associated connector; wherein the second end of the rod is configured to fit into one of the at least three coupling-holes of a second associated connector of the plurality of connectors, to couple the rod with the second associated connector; at least one panel comprising four panel-edges; wherein each of the four panel-edges of the at least one panel is configured to attach to an associated rod of the plurality of rods; wherein the animal habitat assembly is configurable between an assembled configuration and a wash configuration; wherein in the assembled configuration, a set of twelve rods of the plurality of rods are coupled with a set of eight connectors of the plurality of connectors to form a cuboid structure defining four side planes, a bottom plane, and a top plane; each of the four side planes is defined by four rods of the set of twelve rods; each of the four panel-edges of the at least one panel is attached to an associated rod of the four rods of the set of twelve rods defining a side plane of the four side planes; and each connector of the set of eight connectors is coupled with at least three rods of the set of twelve rods, via the three coupling-holes wherein in the wash configuration, the set of twelve rods of the plurality of rods are coupled with the set of eight connectors of the plurality of connectors to form the cuboid structure defining the four side planes, the bottom plane, and the top plane; each of the four side planes is defined by four rods of the set of twelve rods; each of the four panel-edges of the at least one panel is detached from the associated rod of the four rods of the set of twelve rods defining a side plane of the four side planes; and each connector of the set of eight connectors is coupled with at least three rods of the set of twelve rods, via the three coupling-holes.

Example 11. An animal habitat assembly comprising: a cuboid structure defining four side planes, a bottom plane, and a top plane; at least one panel comprising: four panel-edges; at least one fastener at each of the four panel-edges of the at least one panel, the at least one fastener configured to attach the at least one panel to the cuboid structure; wherein the animal habitat assembly is configurable between an assembled configuration and a wash configuration; wherein in the assembled configuration, the at least one panel is removably attached to the cuboid structure; wherein in the wash configuration, the at least one panel is detached from the cuboid structure.

Example 12. An animal habitat assembly comprising: a cuboid structure defining four side planes, a bottom plane, and a top plane; at least one panel comprising: four panel-edges; at least one attachment point; and an accessory removably attached to the panel via the attachment point.

Example 13. The animal habitat assembly of Example 12 wherein the attachment point is located on one of the four side planes of the cuboid structure.

What is claimed is:

1. An animal habitat assembly comprising:
   a plurality of connectors, each of the plurality of connectors comprising:
      a body; and
      at least three coupling-holes formed in the body, each of the three coupling-holes oriented transverse to each other;
   a plurality of rods, each of the plurality of rods comprising:
      a first end; and
      a second end;
      wherein the first end of a rod of the plurality of rods is configured to fit into one of the at least three coupling-holes of a first associated connector of the plurality of connectors, to couple the rod with the first associated connector;
      wherein the second end of the rod is configured to fit into one of the at least three coupling-holes of a second associated connector of the plurality of connectors, to couple the rod with the second associated connector;
   at least one panel comprising four panel-edges;
      wherein each of the four panel-edges of the at least one panel is configured to attach to an associated rod of the plurality of rods;
      wherein the animal habitat assembly is configurable between a first configuration and a second configuration;
      wherein in the first configuration,
         each of the plurality of rods is decoupled from each of the first associated connector and the second associated connector; and
         each of the four panel-edges of the at least one panel is detached from an associated rod; and
      wherein in the second configuration,
         a set of twelve rods of the plurality of rods are coupled with a set of eight connectors of the plurality of connectors to form a cuboid structure defining four side planes, a bottom plane, and a top plane;
         each of the four side planes is defined by four rods of the set of twelve rods;
         each of the four panel-edges of the at least one panel is attached to an associated rod of the four rods of the set of twelve rods defining a side plane of the four side planes;
         each connector of the set of eight connectors is coupled with at least three rods of the set of twelve rods, via the three coupling-holes; and
      a base configured to support the cuboid structure, the base comprising:
         a first half longitudinal section; and
         a second half longitudinal section;
         wherein the first half longitudinal section and the second half longitudinal section are configured to engage with each other to together define:
            a hollow cylindrical portion;
            a bottom frustrum portion defined at a bottom end of the hollow cylindrical portion; and
            a top frustrum portion defined at a top end of the hollow cylindrical portion.

2. The animal habitat assembly of claim 1, wherein each of the plurality of connectors comprises four coupling-holes, wherein two of the four coupling-holes are oriented opposite to each other.

3. The animal habitat assembly of claim 2, wherein in the second configuration,
   a set of twenty rods of the plurality of rods is coupled with a set of twelve connectors of the plurality of connectors to form a double-cuboid structure,
   wherein the set of twenty rods includes the set of twelve rods,
   wherein the set of twelve connectors includes the set of eight connectors, wherein the double-cuboid structure comprises:
  a first cuboid structure defining four side planes, wherein each of the four side planes is defined by four rods of the set of twenty rods; and
  a second cuboid structure positioned above the first cuboid structure and comprising four side planes, wherein each of the four side planes is defined by four rods of the set of twenty rods;
  wherein each of four connectors of the set of twelve connectors is coupled with four rods of the set of twenty rods, via the four coupling-holes;
  wherein each of remaining eight connectors of the set of twelve connectors is coupled with three rods of the set of twenty rods, via three coupling-holes of the four coupling-holes; and
  wherein each of the four panel-edges of the at least one panel is attached to an associated rod of the four rods of the set of twenty rods defining a side plane of the four side planes of the first cuboid structure or the second cuboid structure.

4. The animal habitat assembly of claim 1, wherein the at least one panel is configured to attach to an associated rod of the plurality of rods via at least one fastener.

5. The animal habitat assembly of claim 4, wherein each panel-edge of the at least one panel comprises:
  at least one loop configured to loop around a rod; and
  wherein the at least one loop comprises:
    at least one fastener configured to fasten with the at least one panel.

6. The animal habitat assembly of claim 1, wherein the at least one panel comprises a fabric.

7. The animal habitat assembly of claim 1, and further comprising:
  a bottom plate comprising four plate-edges; and
  wherein the bottom plate is configured to be attached to four rods defining the bottom plane of the cuboid structure.

8. The animal habitat assembly of claim 7, wherein the bottom plate comprises at least one bracket provided at each of the four plate-edges; and
  wherein each of the at least one bracket is configured to engage with a rod of the four rods defining the bottom plane, to attach the bottom plate to the four rods.

9. The animal habitat assembly of claim 7, wherein the bottom plate is configured to be positioned over the base.

10. The animal habitat assembly of claim 1 and further comprising:
  a top plate comprising four plate-edges;
  wherein the top plate is configured to be attached to four rods defining the top plane of the cuboid structure;
  wherein the top plate comprises:
    at least one bracket provided at each of the four plate-edges; and
    wherein each of the at least one bracket is configured to engage with a rod of the four rods defining the top plane, to attach the top plate to the four rods defining the top plane.

11. The animal habitat assembly of claim 1, wherein each of the plurality of rods and the plurality of connectors is configured to receive a fastener to fasten a rod of the plurality of rods with a connector of the plurality of connectors.

12. The animal habitat assembly of claim 1, wherein each of the plurality of rods comprises one of a circular and a polygonal cross-section.

13. The animal habitat assembly of claim 1, wherein each of the at least three coupling-holes of each of the plurality of connectors comprises:
  one of a circular and a polygonal cross-section similar to cross-section of each of the plurality of rods.

14. The animal habitat assembly of claim 1, wherein the base is configurable between a first configuration and a second configuration;
  wherein in the first configuration,
    the first half longitudinal section and the second half longitudinal section are disengaged from each other; and
    the first half longitudinal section is configured to collapse into the second half longitudinal section; and
  wherein in the second configuration,
    the first half longitudinal section and the second half longitudinal section are engaged with each other to together define the hollow cylindrical portion, the bottom frustrum portion, and the top frustrum portion.

15. The animal habitat assembly of claim 1 and further comprising:
  at least one ramp, wherein the at least one ramp comprises:
    a top edge;
    a bottom edge; and
    a slant surface defined between the top edge and the bottom edge.

16. The animal habitat assembly of claim 15, wherein the at least one ramp is configured to mount on:
  one of the four rods defining the bottom plane of the cuboid structure via the top edge; or
  one of the four rods defining the top plane of the cuboid structure via the top edge.

17. The animal habitat assembly of claim 16, wherein the at least one ramp comprises:
  a pair of claws provided on the top edge; and
  wherein the at least one ramp is configured to mount on one of the four rods defining the bottom plane or on one of the four rods defining the top plane of the cuboid structure, via the pair of claws.

18. An animal habitat assembly comprising:
  a plurality of connectors, each of the plurality of connectors comprising:
    a body;
    a first pair of coupling-holes formed in the body and defined opposite to each other;
    a second pair of coupling-holes formed in the body and defined opposite to each other; and
    a third pair of coupling-holes formed in the body and defined opposite to each other;
    wherein the first pair, the second pair, and the third pair of the coupling-holes are oriented along x-axis, y-axis, and z-axis, respectively;
  a plurality of rods, each of the plurality of rods comprising:
    a first end; and
    a second end;
    wherein the first end of a rod of the plurality of rods is configured to fit into one coupling-hole of the first pair, the second pair, and the third pair of the coupling-holes of a first associated connector of the plurality of connectors, to couple the rod with the first associated connector;
    wherein the second end of the rod is configured to fit into one coupling-hole of the first pair, the second pair, and the third pair of the coupling-holes of a second associated connector of the plurality of connectors, to couple the rod with the second associated connector;
at least one panel comprising four panel-edges;
wherein each of the four panel-edges of the at least one panel is configured to attach to an associated rod of the plurality of rods;
wherein the animal habitat assembly is configurable between a first configuration and a second configuration;
wherein in the first configuration,
each of the plurality of rods is decoupled from each of the first associated connector and the second associated connector; and
each of the four panel-edges of the at least one panel is detached from an associated rod; and
wherein in the second configuration,
a set of rods of the plurality of rods are coupled with a set of connectors of the plurality of connectors to form at least one cuboid structure defining at least four side planes, at least one bottom plane, and at least one top plane; and
a base configured to support the first cuboid structure, the base comprising:
a first half longitudinal section; and
a second half longitudinal section;
wherein the first half longitudinal section and the second half longitudinal section are configured to engage with each other to together define:
a hollow cylindrical portion;
a bottom frustrum portion defined at a bottom end of the hollow cylindrical portion; and
a top frustrum portion defined at a top end of the hollow cylindrical portion.

19. The animal habitat assembly of claim 18, wherein the at least one panel is one of:
a first type panel comprising four panel-edges; and
a second type panel comprising four panel-edges;
wherein the first type panel comprises:
two loops at each of the four panel-edges; and
wherein the second type panel comprises:
two loops at each of two of the four panel-edges facing opposite to each other; and
one loop at each of remaining two of the four panel-edges facing opposite to each other.

20. A method of assembling an animal habitat, the method comprising:
providing a plurality of connectors, each of the plurality of connectors comprising:
a body; and
at least three coupling-holes formed in the body;
wherein the at least three coupling-holes are oriented transverse to each other;
providing a plurality of rods, each of the plurality of rods comprising:
a first end; and
a second end;
wherein the first end of a rod of the plurality of rods is configured to fit into one of the at least three coupling-holes of a first associated connector of the plurality of connectors, to couple the rod with the first associated connector;
wherein the second end of the rod is configured to fit into one of the at least three coupling-holes of a second associated connector of the plurality of connectors, to couple the rod with the second associated connector;
coupling the plurality of connectors with the plurality of rods to form at least one cuboid structure defining:
at least four side planes, each defined by four rods;
at least one bottom plane, each defined by four rods; and
at least one top plane, each defined by four rods;
attaching a panel along one of the at least four side planes, the at least one bottom plane, and the at least one top plane;
wherein the panel comprises:
four panel-edges; and
at least one loop provided at each of the four panel-edges; and
wherein attaching the panel comprises:
looping the at least one loop about a rod of the four rods defining one of the at least four side planes, the at least one bottom plane, and the at least one top plane; and
upon looping, fastening the loop with the panel using at least one fastener; and
providing at least one base configured to support the at least one cuboid structure, wherein the at least one base comprises:
a first half longitudinal section; and
a second half longitudinal section;
wherein the first half longitudinal section and the second half longitudinal section are configured to engage with each other to together define:
a hollow cylindrical portion;
a bottom frustrum portion defined at a bottom end of the hollow cylindrical portion; and
a top frustrum portion defined at a top end of the hollow cylindrical portion; and
wherein the at least one base is configurable between a first configuration and a second configuration.

21. The method of claim 20, wherein the at least one panel is one of:
a first type panel comprising four panel-edges; and
a second type panel comprising four panel-edges;
wherein the first type panel comprises:
two loops at each of the four panel-edges; and
wherein the second type panel comprises:
two loops at each of two of the four panel-edges facing opposite to each other; and
one loop at each of remaining two of the four panel-edges facing opposite to each other.

22. The method of claim 20 further comprising:
upon coupling the plurality of connectors with the plurality of rods, fastening each of the plurality of rods with an associated connector of the plurality of connectors using a fastener.

23. The method of claim 20 further comprising:
providing a bottom plate comprising four plate-edges; and
attaching the bottom plate to the four rods defining the at least one bottom plane of the at least one cuboid structure.

24. The method of claim 23, wherein the bottom plate comprises:
at least one bracket provided at each of the four plate-edges; and
wherein attaching the bottom plate comprises:
engaging each of the at least one bracket with a rod of the four rods defining the at least one bottom plane, to attach the bottom plate to the four rods defining the at least one bottom plane.

25. The method of claim 20 further comprising:
providing a top plate comprising four plate-edges; and
attaching the top plate to the four rods defining the at least one top plane of the at least one cuboid structure.

26. The method of claim 25, wherein the top plate comprises:
at least one bracket provided at each of the four plate-edges; and
wherein attaching the top plate comprises:
engaging each of the at least one bracket with a rod of the four rods defining the at least one top plane, to attach the top plate to the four rods defining the at least one top plane.

27. The method of claim 20, further comprising:
providing the at least one base in the first configuration, wherein in the first configuration,
the first half longitudinal section and the second half longitudinal section are disengaged from each other; and
the first half longitudinal section is configured to collapse into the second half longitudinal section; and
configuring the at least one base into the second configuration by:
engaging the first half longitudinal section and the second half longitudinal section with each other to together define the hollow cylindrical portion, the bottom frustrum portion, and the top frustrum portion.

28. The method of claim 27 further comprising:
upon configuring the at least one base into the second configuration, positioning the at least one cuboid structure over the at least one base.

\* \* \* \* \*